United States Patent [19]

Farmer

[11] Patent Number: 5,642,100
[45] Date of Patent: Jun. 24, 1997

[54] METHOD AND APPARATUS FOR CONTROLLING THERMAL RUNAWAY IN A BATTERY BACKUP SYSTEM

[76] Inventor: Walter E. Farmer, 385 Wyldewood Dr., McDonough, Ga. 30253

[21] Appl. No.: 522,572

[22] Filed: Sep. 1, 1995

Related U.S. Application Data

[63] Continuation-in-part of Ser. No. 153,753, Nov. 17, 1993, abandoned.

[51] Int. Cl.⁶ ..................................... G08B 21/00
[52] U.S. Cl. ................... 340/636; 340/635; 340/664; 307/31; 307/35; 307/38; 320/39; 320/48
[58] Field of Search ..................... 340/636, 635, 340/661, 662, 664; 429/91; 320/48, 39, 35; 327/14, 39; 307/33–35, 38, 31; 324/426, 427; 364/492, 493

[56] References Cited

U.S. PATENT DOCUMENTS

| | | | |
|---|---|---|---|
| 3,940,679 | 2/1976 | Brandwein et al. | 320/48 |
| 4,114,083 | 9/1978 | Benham et al. | 340/636 |
| 4,451,773 | 5/1984 | Papathomas et al. | 320/59 |
| 4,845,637 | 7/1989 | Basarath et al. | 364/492 |
| 5,214,370 | 5/1993 | Harm et al. | 320/35 |
| 5,304,916 | 4/1994 | Le et al. | 320/23 |
| 5,331,314 | 7/1994 | Koch | 340/661 |

*Primary Examiner*—Thomas Mullen
*Assistant Examiner*—Ashok Mannava
*Attorney, Agent, or Firm*—Needle & Rosenberg, P.C.

[57] ABSTRACT

An energy management system comprising a method and an apparatus for controlling thermal runaway in a telecommunications switching station backup battery recharging system receiving current from a power supply and delivering current through a rectifier to a battery and a load, the system having a low voltage disconnect switch capable of interrupting current to the battery. A current shunt is provided for generating a first signal having a first value representative of the current flowing through the rectifier. A current shunt is provided for generating a second signal having a second value representative of the current flowing through the load. A microprocessor is provided for calculating a third value, the third value being equal to the second value subtracted from the first value. A microprocessor is also provided for generating a third signal indicative of thermal runaway when the third value exceeds a predetermined value. A switch for interrupting current to the battery when the third signal exceeds the predetermined value may also be provided.

20 Claims, 17 Drawing Sheets

METHOD AND APPARATUS FOR CONTROLLING THERMAL RUNAWAY IN A BATTERY BACKUP SYSTEM

CROSS-REFERENCE TO RELATED APPLICATION

This is a continuation-in-part of my application Ser. No. 08/153,753, filed Nov. 17, 1993, now abandoned.

REFERENCE TO MATERIAL SUBJECT TO COPYRIGHT PROTECTION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

BACKGROUND OF THE INVENTION

1. Field of the Invention

This application relates to devices and methods for recharging backup power supplies used in telecommunications systems, and more particularly to such devices and methods with thermal runaway control.

2. Description of the Prior Art

Electrical energy cost for the operation of sophisticated telecommunications systems has increased disproportionately to the other plant operation costs. The energy cost increase includes significant contributions other than merely the increases in power companies rates. Part of the reason is a change in the power consumption characteristics of newer telecommunication equipment.

Power consumption for older telecommunications processing equipment, for the most part, followed telephone traffic demand. High volumes of telephone traffic resulted in high volumes of power consumption. This type of energy demand resulted in small numbers of telephone power generating units connected during low demand times and large numbers of telephone power generating units connected during high demand times. Power control was accomplished with elaborate circuitry, and resulted in older telephone power plants being very energy efficient.

On the other hand, power consumption for newer sophisticated telecommunications processing equipment is static, i.e., relatively constant irrespective of telephone traffic demand. Thus, the associated telephone power generating units are all connected and share the telephone power consumption demand. Telephone power generating units are now, for the most part, state of the art, controlled ferroresonant, SCR (silicon controlled rectifier) and Switch Mode rectifiers. When these types of rectifiers are used in a method of random output with all units connected, and without proportional load sharing and/or control, as is done in some present telephone power plants, energy inefficiencies result.

Experience has shown that electrical power consumption in the telecommunications industry is not only large, but is increasing. Thus, seemingly small positive efficiency changes have the potential to yield large energy cost savings. For example, a 48 volt, 500 ampere telephone power plant consumes approximately 25,000 watts of electrical energy:

$$volts \times (amps/efficiency) \times power\ factor = watts\ input$$

This amount equates to 25 kwhr (watts/1000=kwhr) every hour, every day, and every year. At a typical cost of eight cents per kwhr, this equates to an energy cost of $17,520.00 per year:

$$kwhr \times cost/kwhr \times 24(hrs/day) \times 365(days/year) = energy\ cost/yr$$

Every positive energy efficiency percentage point change would result in an ongoing $175.00 per year energy cost savings. Of course, as telecommunications demand increase, there will be a subsequent increase in telephone power plant sizes and numbers. Use of an energy management system with this growth of power plants can yield large energy cost savings.

Energy control systems are already in existence, but are usually part of a very complex and expensive circuit design. Such existing circuits are primarily used for remote monitoring and diagnostics of telephone power systems, and usually do not provide thermal runaway control.

Thermal runaway is a detrimental and often dangerous condition that can occur in certain types of newly developed sealed, valve-regulated lead acid batteries that are used for backup power in telecommunications systems. This condition can occur when the ambient temperature is at 110° F. or higher and/or excessive recharge current is used. In either case, a degradation in open circuit cell voltage is caused by high internal temperatures created as a result of either high ambient temperatures or increased $I^2R$ heat from excessive recharge current. In addition, a decrease in open circuit cell voltage results in a larger than normal difference of potential between open circuit cell voltage and float voltage. This abnormally large potential difference produces more than normal float current, which, in turn, produces excessive hydrogen gas, which has proven to be explosive when mixed with air in concentrations of 3% or more by volume. In addition, the excessive float current also produces increased $I^2R$ heat which further degrades open circuit voltage which produces yet additional current. The snowballing effect results in thermal runaway.

Excessive recharge current, which may result in thermal runaway, is normally considered to be current in excess of one quarter of the ampere-hour rating of the lead acid battery. Due to engineering practices for sizing batteries and rectifiers based on projected busy hour loads and future growth, it is quite common to have excessive recharge current capacity in telephone power plants. Older technology flooded lead acid batteries are very forgiving. Such batteries have more liquid electrolyte than do sealed batteries. Thus, $I^2R$ heat is conducted out of the cell by the electrolyte, allowing the batteries to be quite tolerant of excessive $I^2R$ heat as a result of excess current. However, the electrolyte in the new valve-regulated batteries is suspended in fiberglass, and does not allow the batteries to tolerate heat as well as flooded technology batteries.

Some energy management systems exist that attempt to control thermal runaway by monitoring temperature and battery string voltage, and from this information, control current to the batteries by reducing rectifier output voltage. While effective, these techniques have led to complicated and expensive energy management systems.

It would thus be desirable to have a simple, inexpensive energy management system for telecommunications equipment that provides local energy management along with thermal runaway control.

SUMMARY OF THE INVENTION

In accordance with the invention, a simple, inexpensive energy management circuit is provided to decrease energy consumption of telephone power conversion equipment and control thermal runaway. The primary targeted equipment is rectifiers, although other power conversion equipment, such as converters, may also benefit. It is envisioned that a proposed energy management system in accordance with this invention may be provided in a unit about the size of a cigar box.

A first aspect of the present invention is an apparatus for controlling thermal runaway in a telecommunications switching station backup battery recharging system receiving current from a power supply and delivering current through a rectifier to a battery and a load, the system having a low voltage disconnect switch capable of interrupting current to the battery. A means is provided for generating a first signal having a first value representative of the current flowing through the rectifier. A means is provided for generating a second signal having a second value representative of the current flowing through the load. A means is provided for calculating a third value, the third value being equal to the second value subtracted from the first value. A means is also provided for generating a third signal indicative of thermal runaway when the third value exceeds a predetermined value for a predetermined period.

Another aspect of the present invention is a method for controlling thermal runaway in a telecommunications switching station backup battery recharging system receiving current from a power supply and delivering current through a rectifier to a battery and a load, the system having a low voltage disconnect switch capable of interrupting current to the battery. A first signal having a first value representative of the current flowing through the rectifier is generated. A second signal having a second value representative of the current flowing through the load is generated. A third value is calculated, the third value being equal to the second value subtracted from the first value. A third signal indicative of thermal runaway when the third value exceeds a predetermined value for a predetermined period is also generated.

Yet another aspect of the present invention is a series of operational steps to be performed on a computer used to control an apparatus for controlling thermal runaway in a telecommunications switching station backup battery recharging system receiving current from a power supply and delivering current through a rectifier to at a battery and a load, the system having a low voltage disconnect switch capable of interrupting current to the battery. A first signal having a first value representative of the current flowing through the rectifier is received by the computer. A second signal having a second value representative of the current flowing through the load is received by the computer. The second value is subtracted from the first value, thereby creating a difference value. The difference value is compared to a preselected fourth value, the fourth value indicating the minimum difference value corresponding to a thermal runaway condition. A signal that indicates thermal runaway is generated when the difference signal is at least equal to the fourth value for a predetermined period.

BRIEF DESCRIPTION OF THE FIGURES OF THE DRAWINGS

FIG. 1(a) shows schematically typical connections between the AC input, power rectifiers, the central office load and strings of backup batteries. FIG. 1(b) shows more detail of the internal structure of a rectifier. FIG. 1(c) shows a typical rectifier control circuit. FIG. 1(d) shows remote control of the rectifier in FIG. 1(c).

DETAILED DESCRIPTION OF THE ILLUSTRATIVE EMBODIMENTS OF THE INVENTION

Figure 1A:
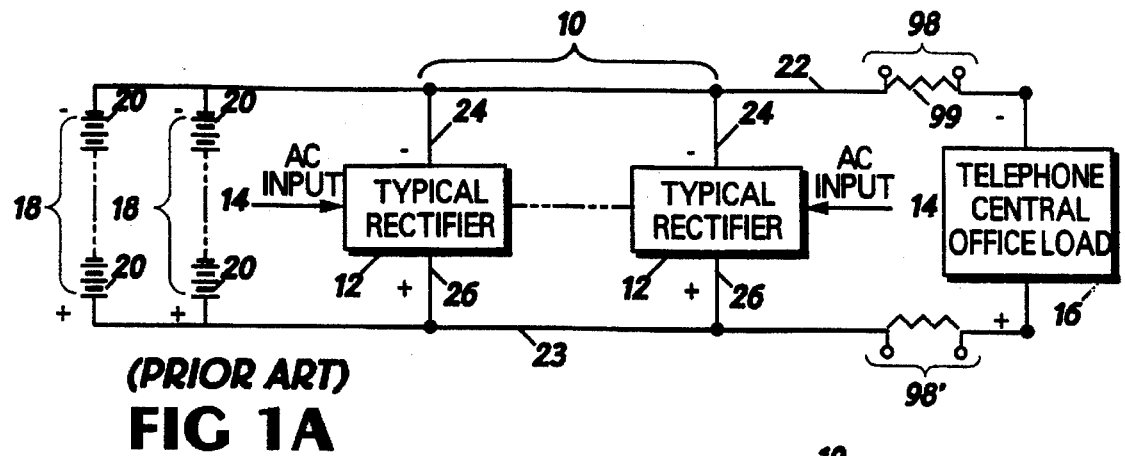
FIGS. 1(a)-(d) are illustrations of a typical prior art telephone power plant.

A typical telephone power plant is shown in FIGS. 1(a)-(d). As shown in FIG. 1(a), a number of high-current, high-wattage rectifiers 10 having separate AC inputs 12 are connected in parallel to provide power from the AC lines 14 to the central office load 16 under normal circumstances. To provide standby power, a number of strings 18 of lead-acid batteries 20 are provided in parallel with the rectifiers 10, the load 16, and themselves. The number of strings 18 are dependent on the size of the load 16, the size of the batteries 20 in ampere-hours, their voltage, and the hours of reserve time required. Because of the high currents required in the power plant, interconnections between the rectifiers 10 and the load 16 are large, high-current rails 22, 23 to prevent ohmic losses and to reduce heat generation. Shunts 99 and 99' and terminals 98 and 98' are present to provide manual monitoring capability so that personnel can monitor central office load current requirements. Typically, only one of shunts 99 and 99' and their respective terminal pair 98 and 98' are present in any installation.

The battery strings 18 are electrically connected to the rectifier outputs 24, 26 at all times and, when fully charged, draw at least a so-called "trickle" current from the rectifiers 10 that is limited solely by the internal resistance of the batteries 20. In normal operation, the batteries 20 draw current from the rectifiers 10, rather than supply current to the load 16, because the output voltage of the battery strings 18, when fully charged, is slightly less than that of the rectifiers 10, when AC power is applied. Other types of charging circuitry in series with the battery strings 18 are impractical because of the high currents and voltages involved. Even a diode placed in series with the strings 18 of batteries 20 would waste considerable energy and generate considerable heat. Also, the batteries 20 must be available to supply power instantly in the event of failure of the main AC input 14. Mechanical switches large enough to control the high currents required do not operate rapidly enough to be of use when connected in series with the battery strings 18.

Figure 1B:
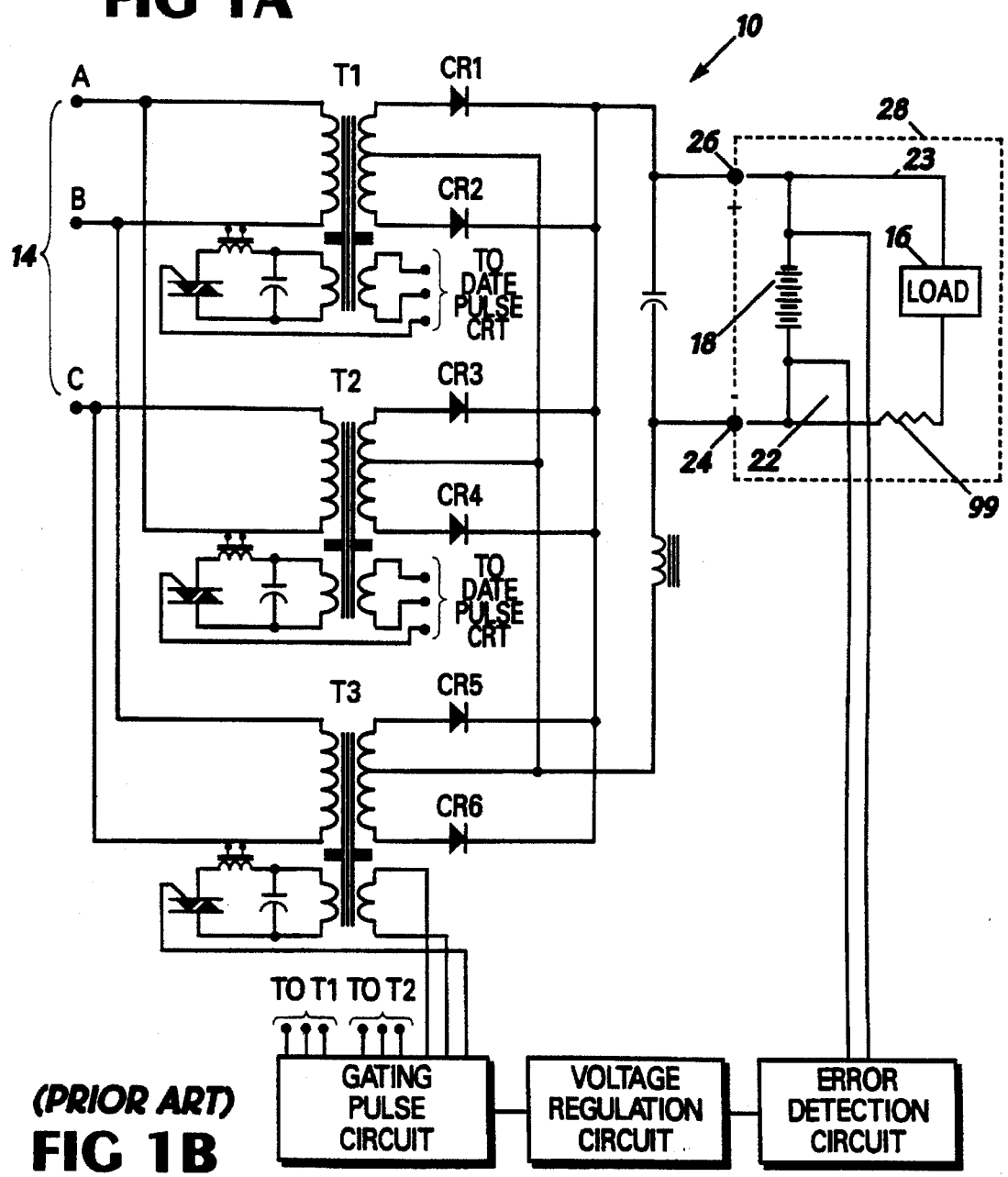

A typical high-current, high-wattage rectifier 10 is shown in more detail in FIG. 1(b). Three-phase AC input 14 is provided on the left, while the external components shown in FIG. 1(a) are shown at the right. (For convenience, these external components are grouped into a box 28 in FIG. 1(b).) The outputs of the other rectifiers 10 shown in FIG. 1(a) (but not FIG. 1(b)) are connected in parallel with the output 24, 26 of the illustrated rectifier 10. A typical rectifier 10 may be rated at 5,000 watts, having a 100 ampere output at 50 volts DC. A telephone power plant may have as many as forty of these rectifiers connected in parallel.

Figure 1C:
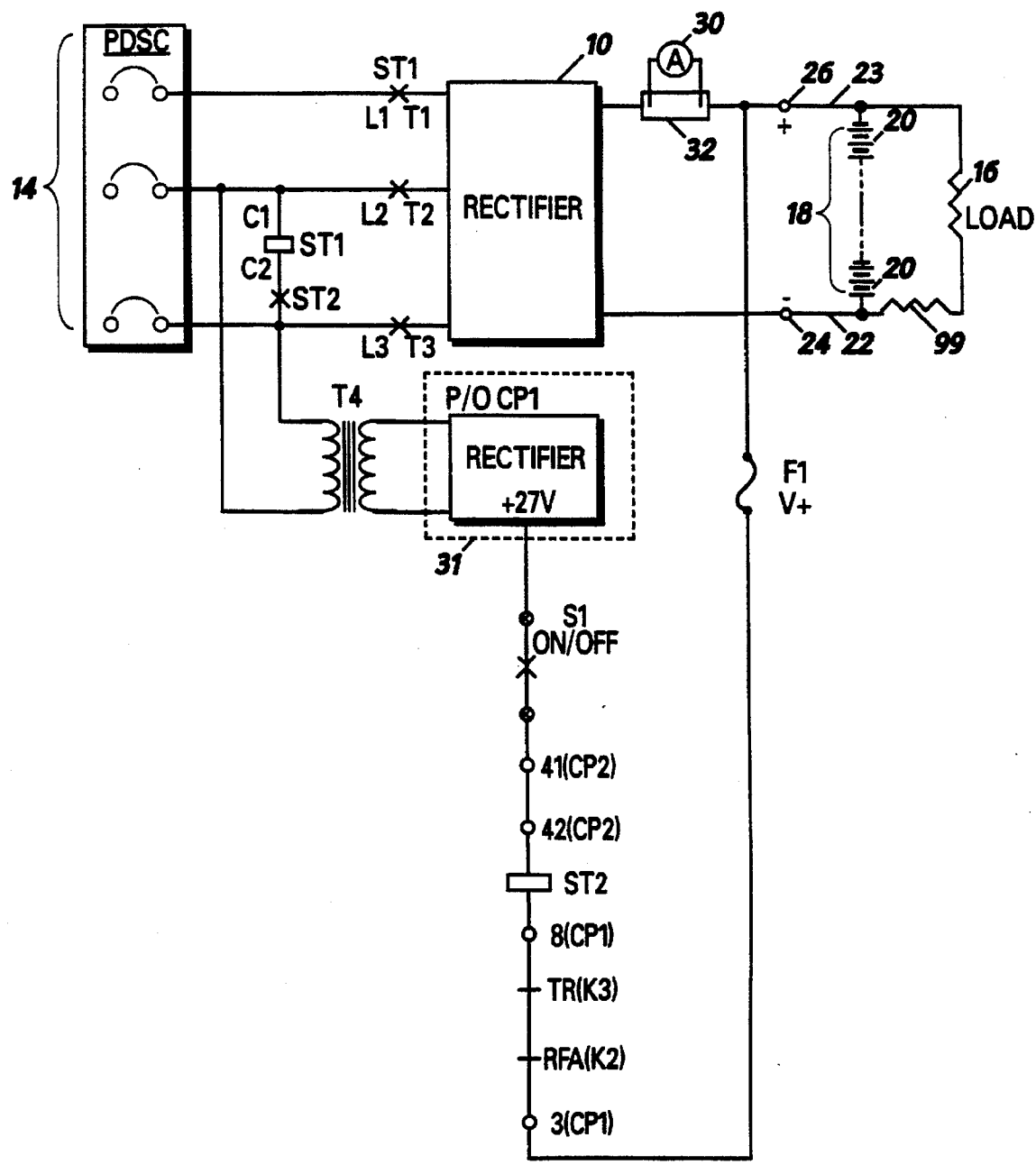

The rectifiers 10 may be individually turned on and off as indicated in FIG. 1(c). When the on/off power switch S1 is turned on, relay ST2 operates, closing a contact which operates contactor ST1. Contacts of contactor ST2 connect the rectifier terminals to L1, L2, and L3, which connect the rectifier 10 to power supply 14. The current supplied by rectifier 10 may be measured by a voltmeter 30 or equivalent means detecting the voltage across high current shunt 32.

Figure 1D:
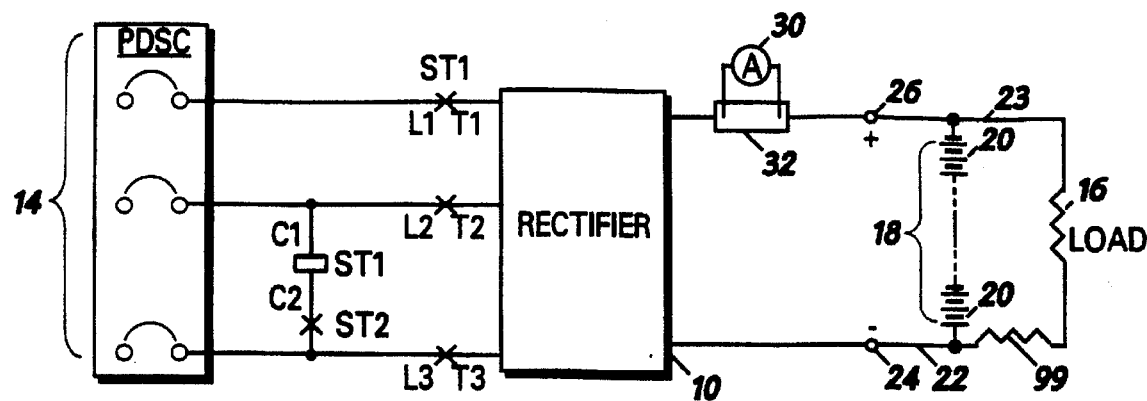
Figure 1D:
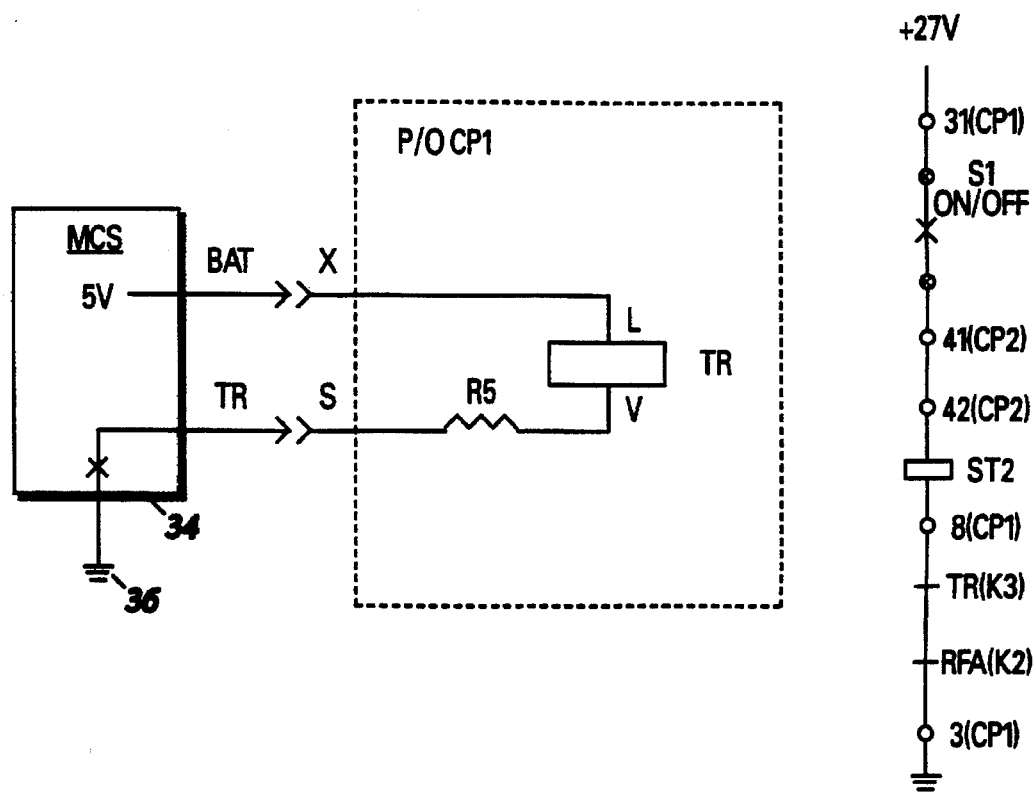
Figure 2A:
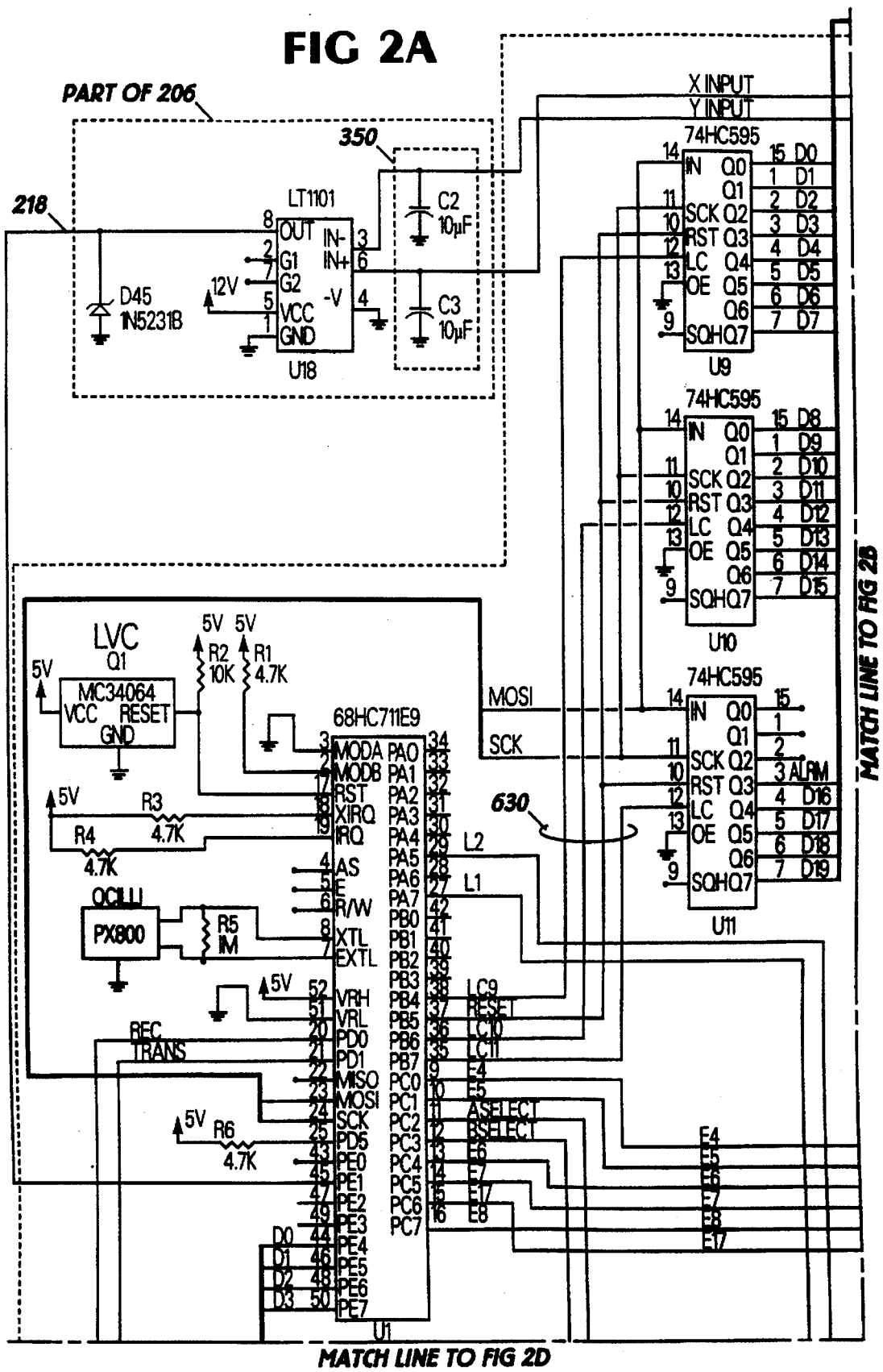
FIG. 2 is a schematic diagram of an energy management system in accordance with the invention.
Figure 2B:
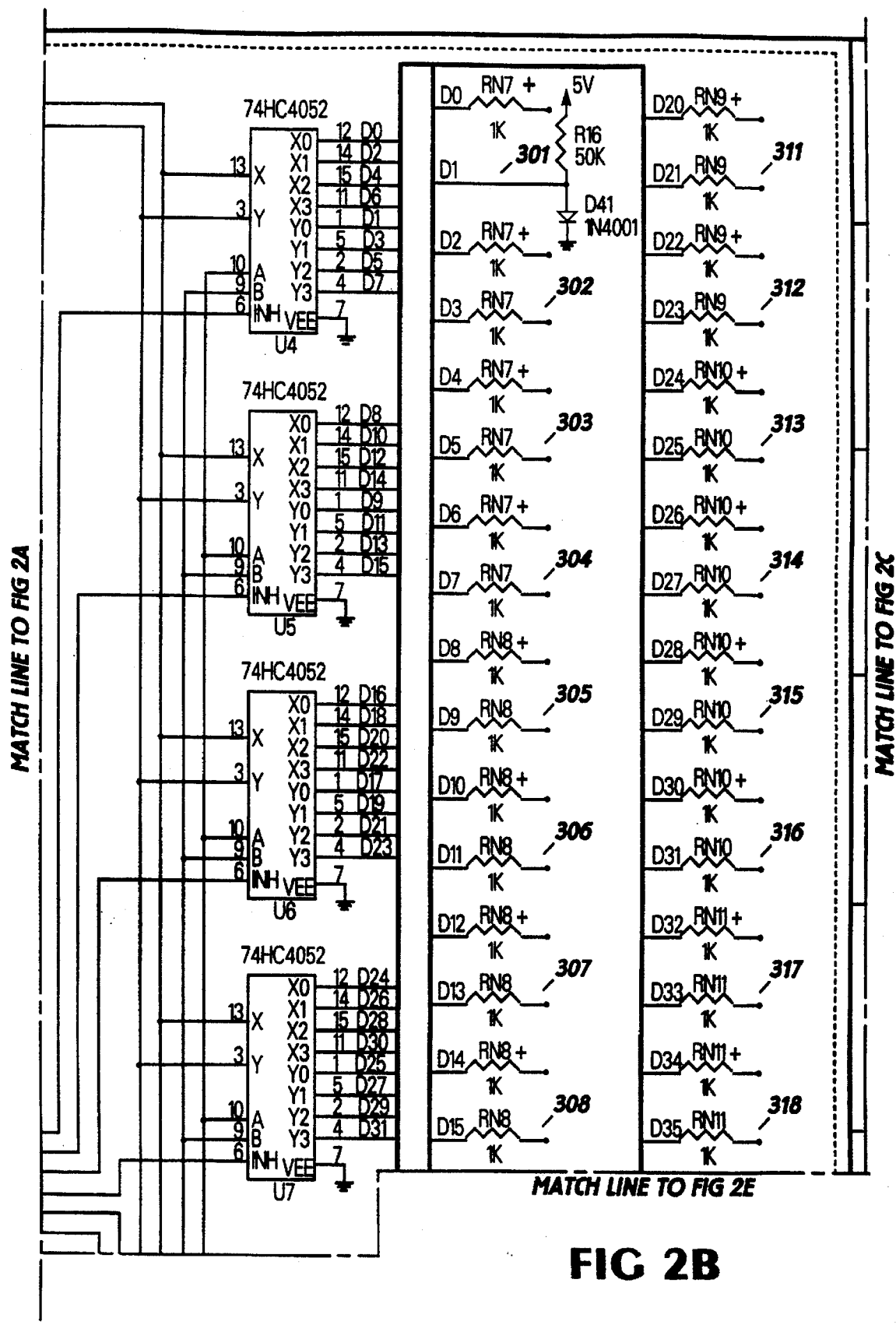
Figure 2C:
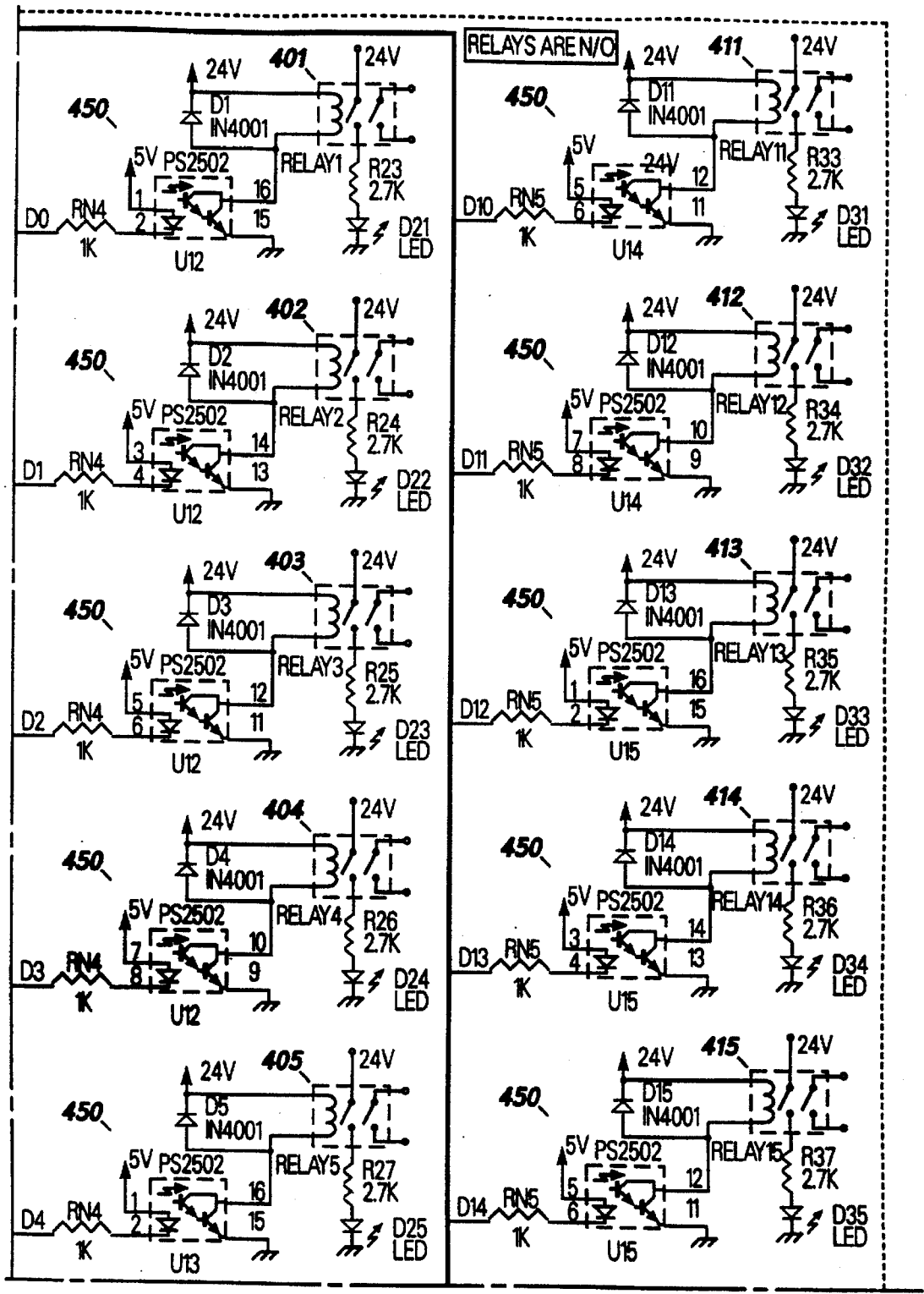
Figure 2D:
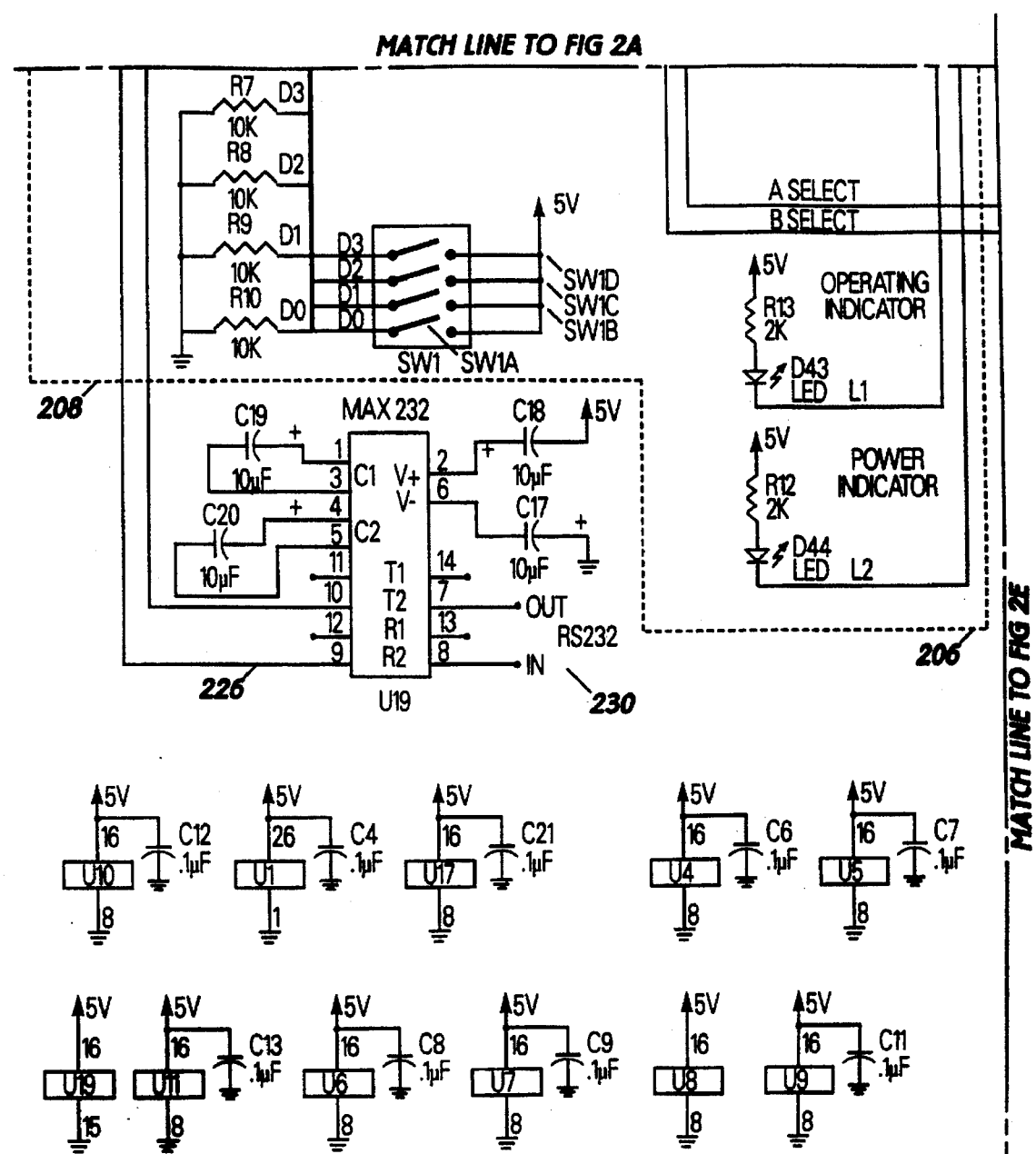
Figure 2E:
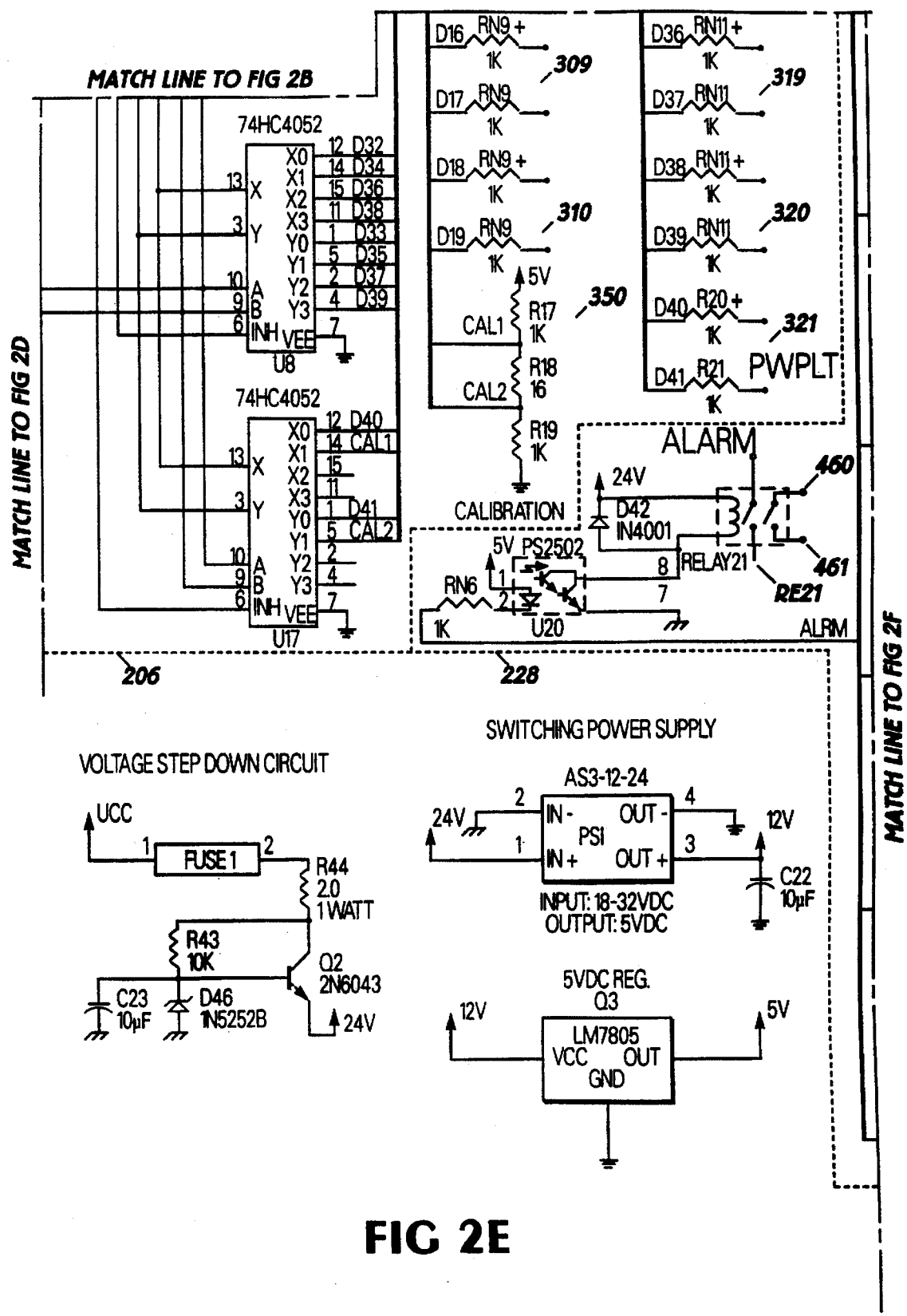
Figure 2F:
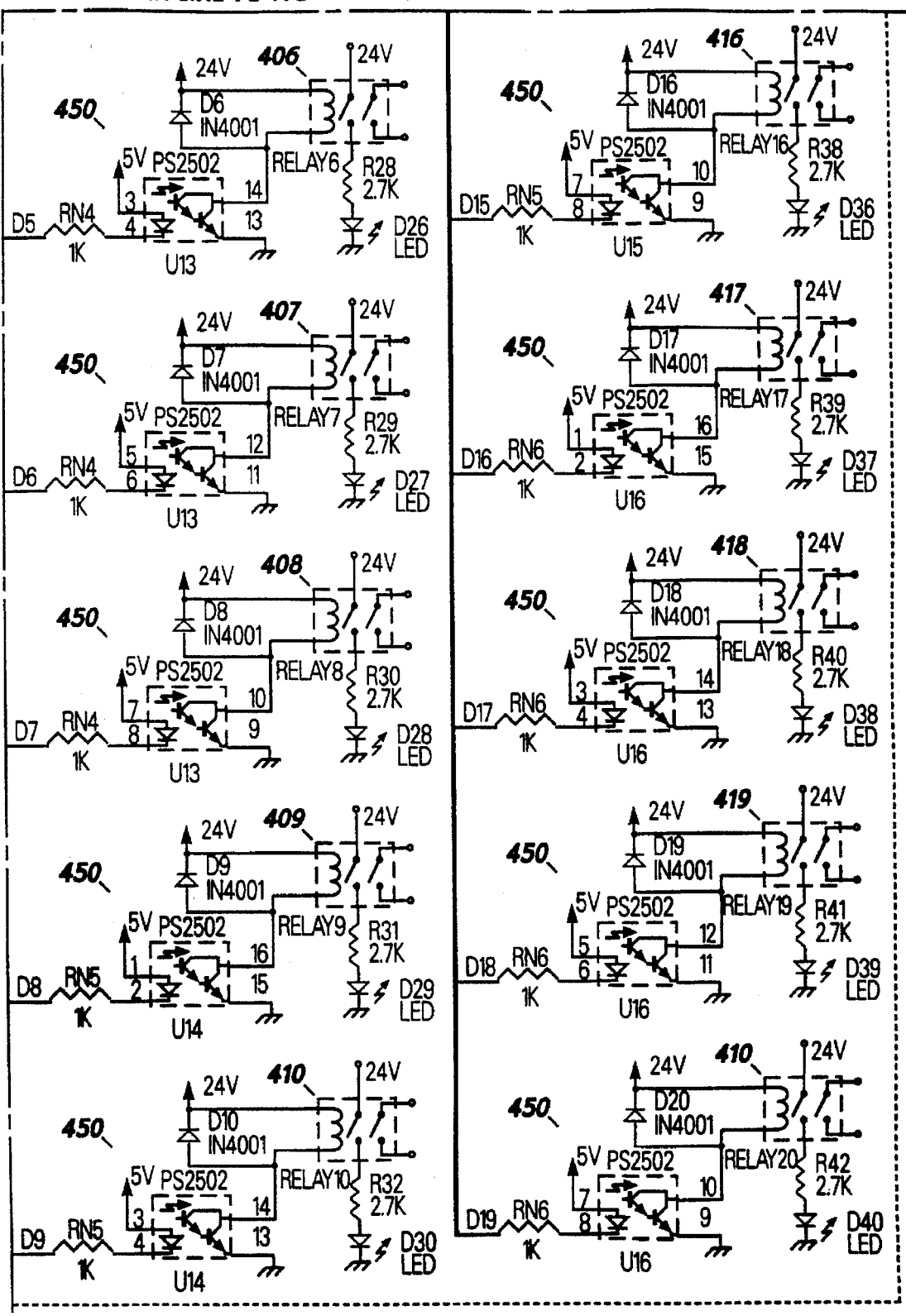

FIG. 1(d) shows the operation of a remote control station 34 controlling rectifier 10. Applying ground 36 to lead TR from the power plant controller or the standby engine rectifier sequence control causes the relay (TR) K3 in the rectifier 10 to operate. When this occurs, the contacts of relay (TR) K3 open, releasing the relay ST2, which in turn releases a contactor in relay ST1. Relay ST1 thus opens, removing AC power 14 from the rectifying circuitry.

The EMS circuit may be considered as comprising three sections; data acquisition, control, and output. An embodiment of an EMS circuit 238 in accordance with the invention is shown in FIG. 2. The data acquisition 206 and control circuits 208 are electrically isolated from the rest of the circuit and are allowed to float to either side of the power station's potential rail, to allow the EMF system to be used with shunts in either rail. Power for the EMS circuit is provided from the associated DC power plant through the use of a voltage step-down circuit that reduces the DC power plant voltage to a regulated 24 volts for convenience. The expected DC power plant voltage could range from 24–152 volts; using 24 volts assures that it will work with all such systems. This is accomplished through the use of power transistor Q2 and zener diode D46. The regulated 24 volts is supplied to a switching power supply PS1 which provides a regulated 12 volts. This regulated 12 volts is supplied to voltage regulator Q9 which provides a regulated 5 volts which are the recommended supplies for the operation of many integrated circuits, including those used in a preferred embodiment described below. Other embodiments using components requiring other voltages are, of course, possible, in which case the power supply would be modified in a conventional manner to provide appropriate supply voltages.

1. Data Acquisition Section

The data acquisition section 206 comprises analog multiplexers, an instrumentation amplifier U18, and an analog-to-digital converter (ADC). Analog multiplexers U4, U5, U6, U7, U8, and U17 switch the analog voltages from the various analog inputs into a single analog channel. Shunts 32 (not shown in FIG. 2) associated with each rectifier 10 (also not shown in FIG. 2) provide a voltage, which is electrically coupled across each input 301–321. Although 21 inputs are shown, those skilled in the art will recognize that the number of inputs may be changed by adding or removing components in accordance with the number of rectifies 10 to be controlled in the power plant. The input at 321 provides for measurement of the actual central office load, minus battery charging current. This measurement is made possible by using an existing shunt 99 or 99' in corresponding rail 22 or 23 of the supply to the telephone central office load 16, as shown in FIG. 1(a). Corresponding terminals 98 or 98' are then connected to input 321 to provide present current requirements. Calibration input 350 is used to provide a known voltage for calibration purposes.

The control section 208 of the EMS, to be discussed in more detail below, enables only one of analog channels 301–321 at a time to appear on line 218. This voltage is fed through a low-pass filter 350 and into an instrumentation amplifier U18. Amplifier U18 multiplies the analog voltage by 100 to convert what is typically a 0–50 millivolt signal into a 0–5 volt signal in the embodiment shown in FIG. 2. The instrumentation amplifier U18 amplifies only differences between signals so that any induced voltages from the high currents found inside the power plant are rejected. Next, the amplified signal on line 218 is sent to an 8-bit ADC, which, in the preferred embodiment, is located inside microprocessor U1. The analog signal is thus converted into a digital value and stored in an internal static RAM bank 212 (not shown in FIG. 2).

2. Control Circuitry

The control circuitry 208 preferably comprises a single-chip microcontroller U1. The EMS is software driven and all software routines and algorithms can be stored in ROM 210 (not shown in FIG. 2) within the single-chip microcontroller U1. Once the microcontroller U1 has obtained the voltage values from the data acquisition section 206, it calculates the actual current for each channel via a look-up table preprogrammed into a non-volatile memory 7 means 240 during the calibration stage. The calibration stage is necessary so that microcontroller U1 can add the available current from each of the active rectifiers monitored through inputs 301–321 to determine if there is enough current being delivered to meet the then-present current requirements. A preferred calibration procedure is as follows:

(1) Remove all power from the EMS unit 238. (The calibrate switch will be set with power removed, thus if the calibrate switch were to be accidentally-operated while the EMS 238 is in service, there will be no adverse effect. The calibrate switch is ignored after about approximately 1 second after power is turned on (i.e., after the start-up routine is completed) so that accidental movement of the switch has no effect.

(2) Operate calibrate switch to ON. In the presently-described embodiment, the calibrate switch SW1C is part of 4 position dip switch SW1). Microprocessor U1, as part of its start-up sequence in ROM 210, is programmed in this embodiment to detect the position of SW1C, and to enter operational or calibration mode depending upon its position. Setting SW1C on, in this embodiment, causes microprocessor U1 to enter calibration mode.

(3) Apply power. LEDs D43, D44, and D21–D40 located on the EMS unit remain on during calibration.

(4) Enter the maximum output amperage rating for each rectifier 10 as measured at its associated EMS input channel 301–320. In this and other calibration steps, the entering of a value is preferably accomplished by means of a conventional computer or display and entry terminal (not shown) connected to RS232 port 230. Microcontroller U1 may thus be programmed in a conventional manner to prompt for and accept inputs from port 230.

(5) Enter the resistance of shunt 32 for each rectifier 10 for each channel 301–320. (Shunts are frequently rated in amperage required for a specified voltage drop. The program could alternately accept this information and apply Ohm's law or use a precalculated lookup table for standard values.)

(6) Enter shunt amp rating for power plant shunt 99 or 99' (only one would normally be used) to calibrate PWPLT channel 321.

(7) Enter the permissible range of recharge current for control of thermal runaway. In the preferred embodiment, this is entered as a recharge factor, as explained below.

(8) Remove power from the EMS unit 238, and operate the calibrate switch SW1C to off.

(9) Apply power to EMS unit 238. Because of the setting of switch SW1C to "off" in step (8), microcontroller U1 will enter operational mode.

Once calibrated, look-up table in non-volatile memory means 240 contains the actual current values proportional to the 0–50 millivolts produced by each shunt 32. (Shunts outputting other voltage ranges could be accommodated by appropriately modified calibration procedures). In operational mode, microcontroller U1 adds all the available current from the active power rectifiers (not shown) and determines if there is enough power to meet the then present power plant requirements. (The comparison is made once per second, but could be made at a greater or lesser frequency, depending upon system needs, and can be made remotely programmable.) If not, another available power plant rectifier is turned on after a 10 second delay by energizing the appropriate relay circuit 401–420, which, as will be explained below, controls one of the power plant rectifiers (not shown in FIG. 2). (The purpose of the 10 second delay is to prevent oscillation.) If there is a surplus of current available, controller U1 calculates whether one power rectifier can safely be turned off and still meet the central office 16 current requirement, plus any programmed battery string 20 charging current requirement. If so, one unit is turned off after a one minute delay. It is preferable to turn one unit on or off at a time, to avoid large transients as a result of sudden current changes, which could either damage equipment or set off nuisance alarms elsewhere in the telephone plant. (Again, the delay is inserted to prevent oscillation.) In addition to the above algorithm, the user can program a maximum surplus current level that is reserved for charging the battery bank, the purpose of which is to prevent the thermal runaway problem discussed above. The delay times are not critical, and can be made remotely programmable, perhaps over pre-programmed default values, to accommodate any special conditions in the power plant.

An important feature of the microcontroller U1 program is that it can be programmed via a terminal or communication link 500 to avoid thermal runaway problems after a power failure of the primary supply source (e.g., commercial power mains). During a power failure, the back-up battery supply (not shown in FIG. 2) supplies power to the telecommunications plant for an indeterminate period of time. Because power outages are unpredictable in both incidence and duration, the usual practice has been to turn on all rectifiers to allow the batteries to recharge at the maximum possible rate. However, this practice predates the introduction of the previously described sealed, valve-regulated lead-acid batteries, and risks damaging them. Because the EMS microcontroller U1 can be programmed for a maximum surplus current level for charging the battery bank (not shown in FIG. 2), this level can be put into effect immediately upon restoration of primary power, either by supplying backup power to U1, which contains scratchpad RAM and ROM that may be used for storing a maximum surplus current level, or by storing the maximum surplus current level in an external nonvolatile memory means accessible to the microcontroller. The microcontroller could read this value and act upon it immediately upon restoration of power.

3. Output Section

The output circuit 228 is directly controlled by the microcontroller U1 in the control section 208 and can control up to 20 rectifiers 10 (not shown in FIG. 2). It will be understood that if the number of rectifiers is other than 20, the circuit may be simplified or expanded accordingly. The control circuit 208 is isolated by use of opto-isolators 450 to transmit the control signals to the 20 individual rectifiers. The output circuits comprise individually controlled relays 401–420 which are normally open along with LED indicators D1–D20 that signal whether the corresponding relay 401–420 is open or closed. The output circuit 228 is designed to control all power rectifiers and provides make and break dry contacts 460, 461 via relay RE21 if the control circuit 208 should fail. An RS-232 port 500 is available via chip U19 (NAX232). Port 500, in conjunction with on-board microcontroller U1, will provide load and rectifier currents. It will also provide battery float or charge currents which can be used to determine if the batteries are threatened by thermal runaway.

Figure 3:
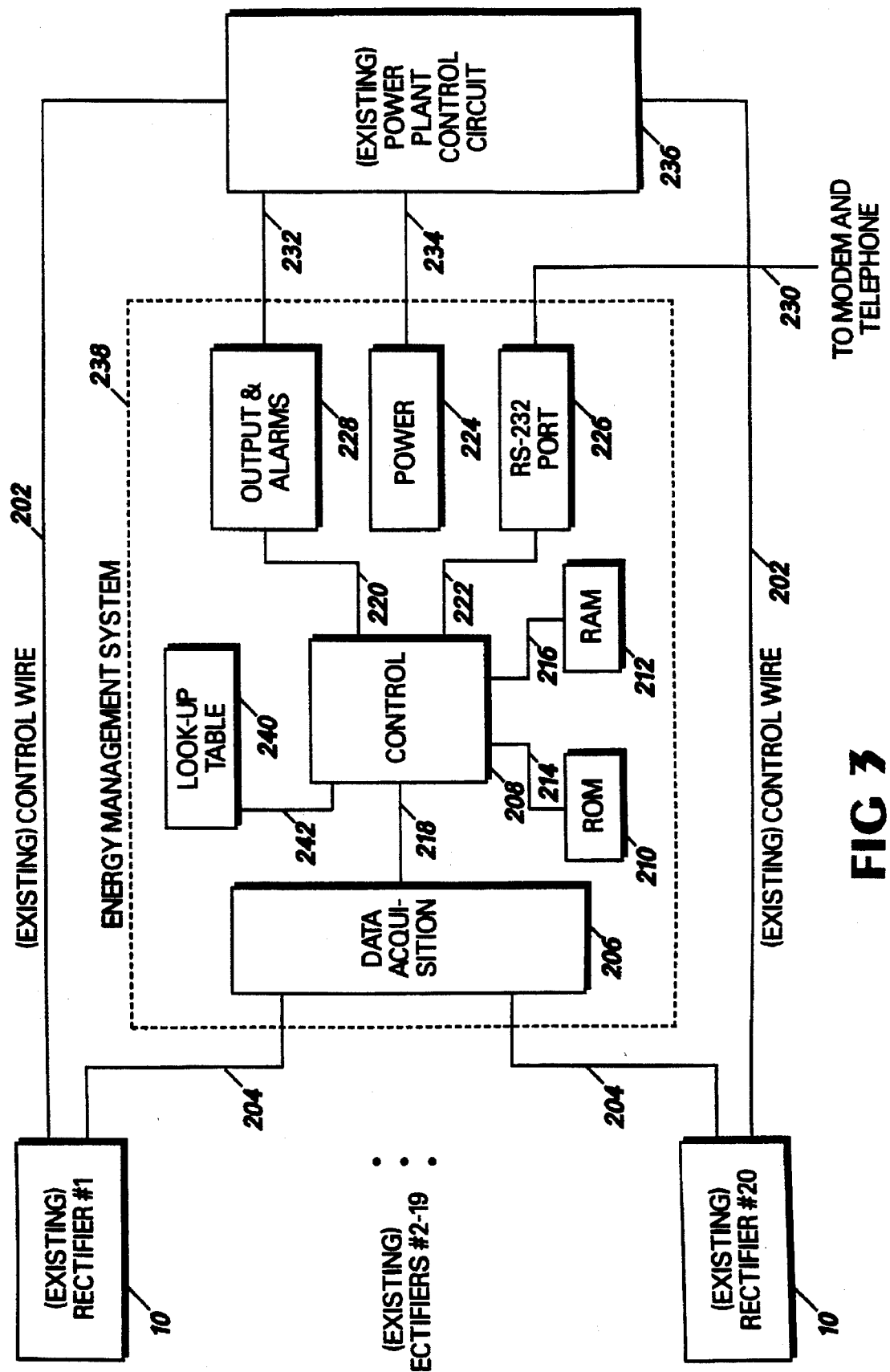
FIG. 3 shows an embodiment of the invention in block diagram form.

FIG. 3 illustrates, in block diagram form, an embodiment of a control system in accordance with the invention. From one to twenty rectifiers 10 are electrically connected, using preexisting control wires 202, to the power plant control circuit 236, which may comprise a number of control stations 34 (as shown in FIG. 1(d)). The power plant control circuit 236 receives its operating power and control signals from an energy management system 238 in accordance with this invention. The energy management system receives data from the data acquisition circuits 206 connected to the rectifiers 200 and through an external communications port, such as RS-232 port 226, which may communicate with an external terminal or computer (now shown) via a modem and telephone lines (also not shown). Of course, it will be readily understood that any other suitable means of communicating information to and from the control processor 208 may be used, such as direct connection to an operator terminal. FIG. 3 shows an embodiment of the invention, which, by way of illustration only, controls 20 rectifiers. One skilled in the art will recognize, however, that the invention is not limited to this number of rectifiers, and that control of a greater or lesser number may readily be provided.

Microcontroller U1, which contains built-in ROM 210 (read only memory) containing the energy management program and built-in scratchpad RAM 212 (random access memory), runs the energy management program shown by the flow diagram in FIG. 4. (Look-up table 240 may be part of RAM 212.) Microcontroller U1 also provides output for serial data port 226, which, in turn, provides input for the controller through a terminal, modem, or other device (not shown) connected to the serial data port. This input may include the maximum allowable battery charging current, which may then be stored in RAM 212, or alternately, this value may be pre-programmed and stored in the controller's ROM 210. Power and operation indicators are provided, as are the required operation and supply voltages. The system shown in FIG. 3 is designed to control 20 rectifiers (not shown), having outputs for channels (CH#) 1 to 20. SW1A, SW1B, and SW1D are unused in the present embodiment, but are available for possible expansion.

For convenience, we shall sometimes refer to the circuitry associated with the measurement of the voltage across a shunt as a measurement channel, and the circuitry associated with the control of a rectifier as a control channel. Usually, the term "measurement channel" and "control channel" will be shortened to "channel" for simplicity, as the type of channel being discussed will be clear from the context.

For purposes of illustration, FIG. 2 shows an embodiment comprising channels 1–20, with the measurement channels corresponding to inputs 301–320 and the output channels corresponding to relays 401–420, respectively. (PWPLT input 321 and calibration input 350 are special input channels, and alarm outputs 460 and 461 correspond to a special output channel. These special channels are not in the discussion below describing the rotation of the primary channel.

4. Start-Up Sequence (1) Step (9) of the calibration procedure begins the start-up sequence.

(2) Preferably after microcontroller U1 performs an internal consistency check and a check of the remainder of the EMS unit 238, all 20 opto-isolators which drive the 20 relays associated with the 20 control channels are biased off. This insures that all relays 1 through 20 are released (non energized). Thus, all rectifiers are allowed to be on during the start-up sequence.

(3) A 24-hour counter is initialized to zero.

(4) A primary channel is selected. (The meaning of "primary channel" is discussed below.) For purposes of initialization, the primary channel selected in the start-up sequence is arbitrary, and may be set at channel 1, corresponding to the rectifier 10 controlled by relay 401.

(5) "Turn-on" and "turn-off" counters are set to zero.

Figure 4A:
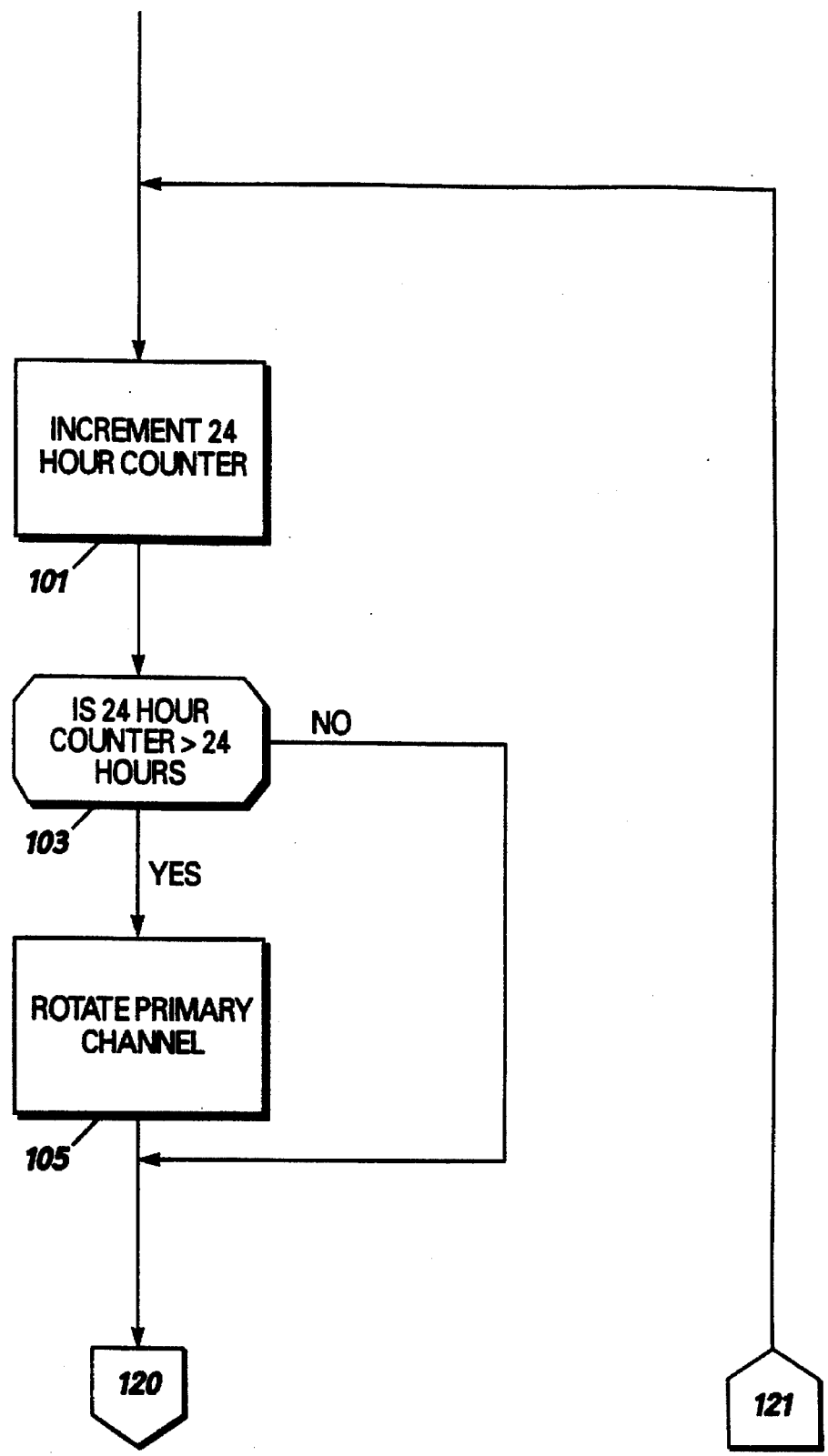
FIGS. 4(a)-(c) are parts of a flow chart showing the operating mode of the microcontroller in accordance with the invention.
Figure 4B:
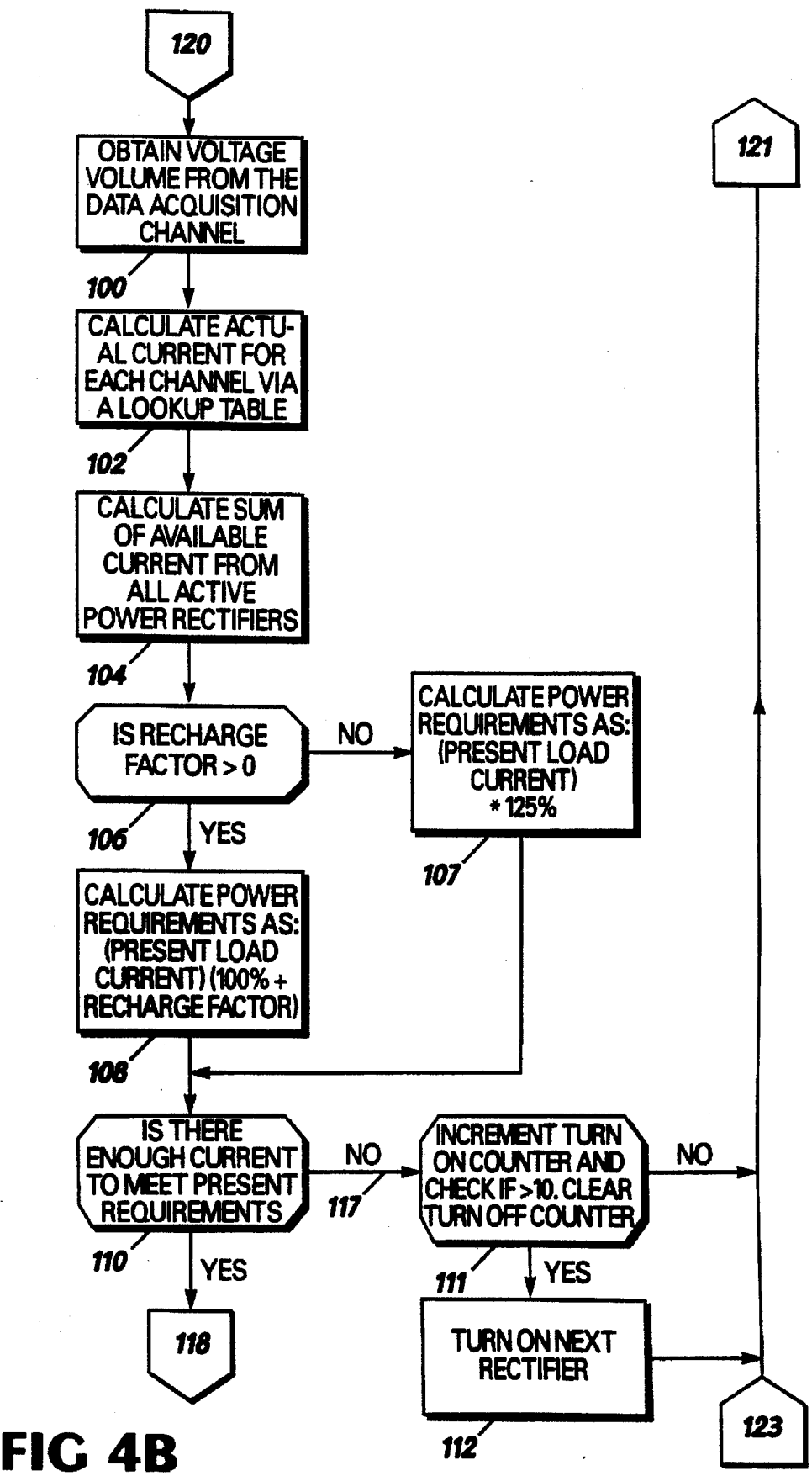
Figure 4C:
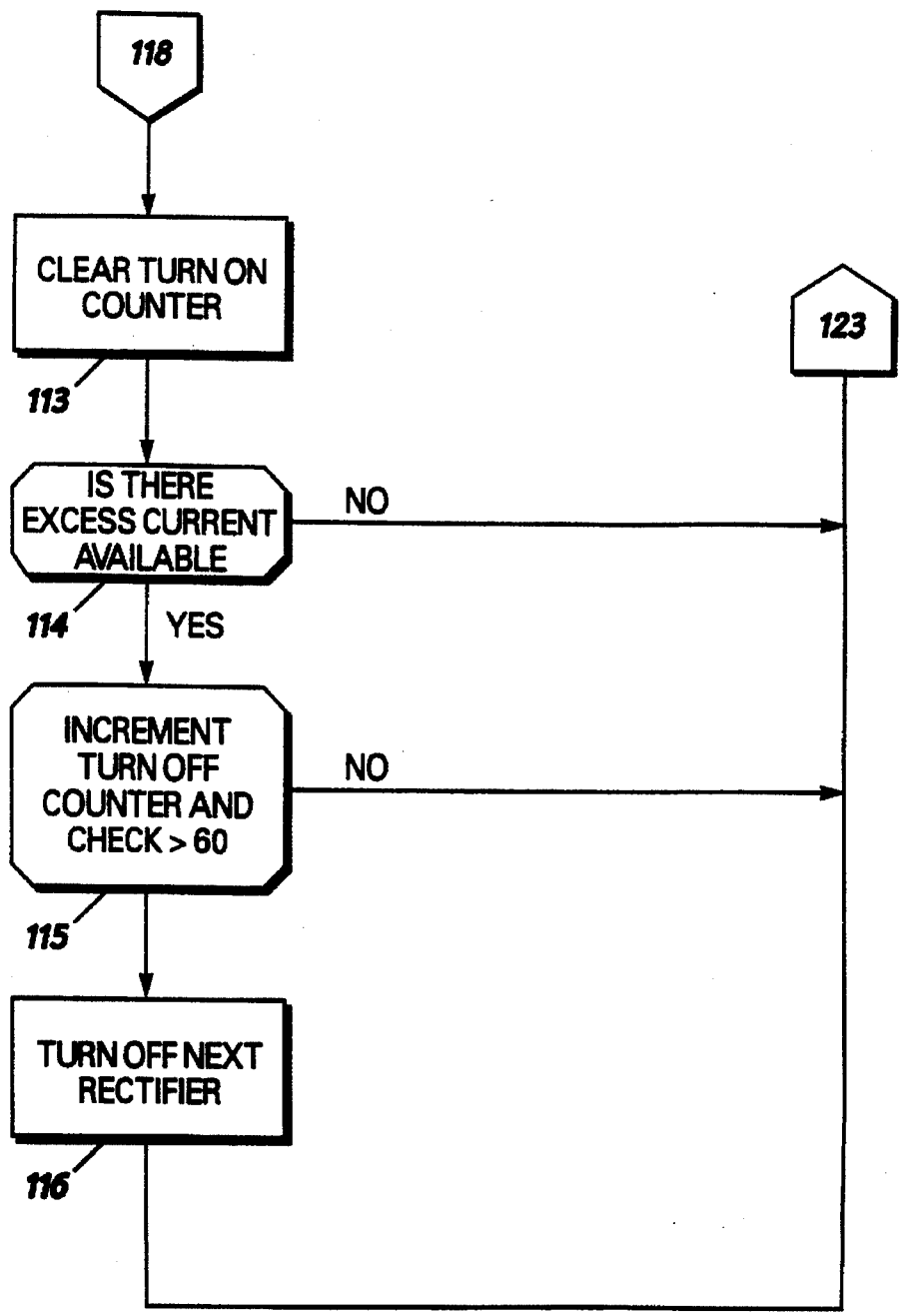

After the program has exited the start-up sequence, the operation of microcontroller U1 will best be understood by reference to the flow chart of FIG. 4(a)–(c). Starting at block 101 on FIG. 4(a), microcontroller U1 increments the 24-hour counter. This counter is then tested to determine whether 24 hours has passed in block 103. If not, execution continues at block 100 on FIG. 4(b). If so, the primary channel is rotated at block 105 before continuing at block 100.

The primary channel corresponds to the first rectifier 10 to be turned on in the switching plant. This may initially be set to the rectifier 10 controlled by relay 401 in FIG. 2. As additional power is needed, additional rectifiers controlled by a fixed sequence of relays are turned on. Although other strategies for controlling the rectifiers may be used, in the preferred embodiment, as additional current is needed, additional rectifiers 10 are turned on by sequentially activating relays 402–420. Conversely, current is reduced, when there is excess current available by sequentially deactivating relays, i.e., the last one activated is the first one deactivated. Because at least one rectifier 10 must be on to supply power at all times (except during a power outage, when stand-by power is supplied by the batteries), the rectifier 10 controlled by relay 401 would be on all the time (duty cycle 100%), with rectifiers corresponding to higher numbered channels having progressively less usage. This unequal power cycling is undesirable and could lead to premature failure of equipment.

To equalize usage of all available rectifiers, blocks 101, 103, and 105 are present to ensure that the first rectifier to be turned on (i.e., the one that is always on) is cycled on a daily basis. Rectifiers 10 continue to be turned on sequentially, but the number of the relay corresponding to the first rectifier turned on is incremented daily. When the highest-numbered relay is turned on (corresponding to the highest-numbered channel), the program provides additional current, when needed, by turning on the lowest-numbered channel next, followed by the second-lowest, etc. The relays 401–420 may thus be considered as being in a cyclical arrangement, with relay 401 coming after relay 420 for the purpose of this daily cycling. When block 105 is executed, unless all rectifiers are already turned on, the rectifier corresponding to the former primary channel is turned off and, simultaneously, the next rectifier (the one that would have been the next to turn on in block 112) is turned on.

It should be understood that the incrementing of a counter is only one of many conventional ways of keeping time. Any conventional timing mechanism, such as the use of hardware timers, may be used with appropriate, well-known programming techniques substituting for those shown here. Also, it should be understood that the 24-hour period used for cycling is not critical.

Continuing block 100 in FIG. 4(b), and referring, where necessary to FIGS. 2 and 3, U1 obtains voltage values from the data acquisition circuit 208. From these values, which may be transferred to a scratch pad RAM 212 (possibly internal to microcontroller U1) for temporary storage, the actual current for each rectifier 10 may be obtained, either from a lookup table in ROM 210 (which also may be internal to microcontroller U1), by Ohm's law from values input during calibration, or any other suitable means at block 102. In addition, the load 16 current, as measured by shunt 99 or 99', is also measured in this step. The total current is then computed by summing all current values from all active power rectifiers in block 104.

Execution then continues at block 106 by determining whether the recharge factor entered during calibration is greater than 0. If so, block 107 is executed, and the current requirement is deemed to be 125% of the total rectifier current calculated. Otherwise, block 108 is executed, and the total power requirement is deemed to be the load 16 current measured in block 102 multiplied by the sum of 100% plus the entered recharge factor.

In either case, the total available rectifier current is compared to the total current requirement in block 110. If the total current requirement is met by the total available rectifier current, execution continues at block 113 (in FIG. 4(c)). Otherwise, the "turn-on" counter is incremental and the "turn-off" counter is reset. If the "turn-on" counter is greater than 10, the next available rectifier is turned on in block 112 in accordance with the rotating sequence described above. Whether block 112 is executed or not, execution then resumes at block 101.

The effect of the "turn-on" counter is that, if sufficient current is not found in block 110, the test is repeated approximately once per second. If sufficient current is not present for 10 seconds, another rectifier is turned on. These times are not critical, however. Moreover, various other conventional timing techniques may be substituted for those shown in FIG. 4(a)–(c), possibly with appropriate modifications in the program flow that would be readily apparent to one skilled in the art.

If there is enough current to meet present requirements in block 110, execution continues in FIG. 4(c) at block 113, where the "turn-on" counter is reset. Next, in block 114, the total available current is compared to the current requirement. If there is no excess current available (or a negligible excess, compared to the desired battery recharge current), execution continues at block 101. Otherwise, the "turn-off" counter is incremental and compared with 60. If it is not greater than 60, execution continues at block 101. Otherwise, of those rectifiers currently on, the one most recently turned on is turned off in block 116, and execution then resumes at block 101. It will be evident to those skilled in the art that the "turn-on" counter accomplishes a result similar to that of the "turn-off" counter except that it effects a 60-second timing period, and that other conventional timing techniques may also be used here to accomplish the same result. Also, as was the case with the 10-second time period, the 60-second time period is also not critical.

Figure 5A:
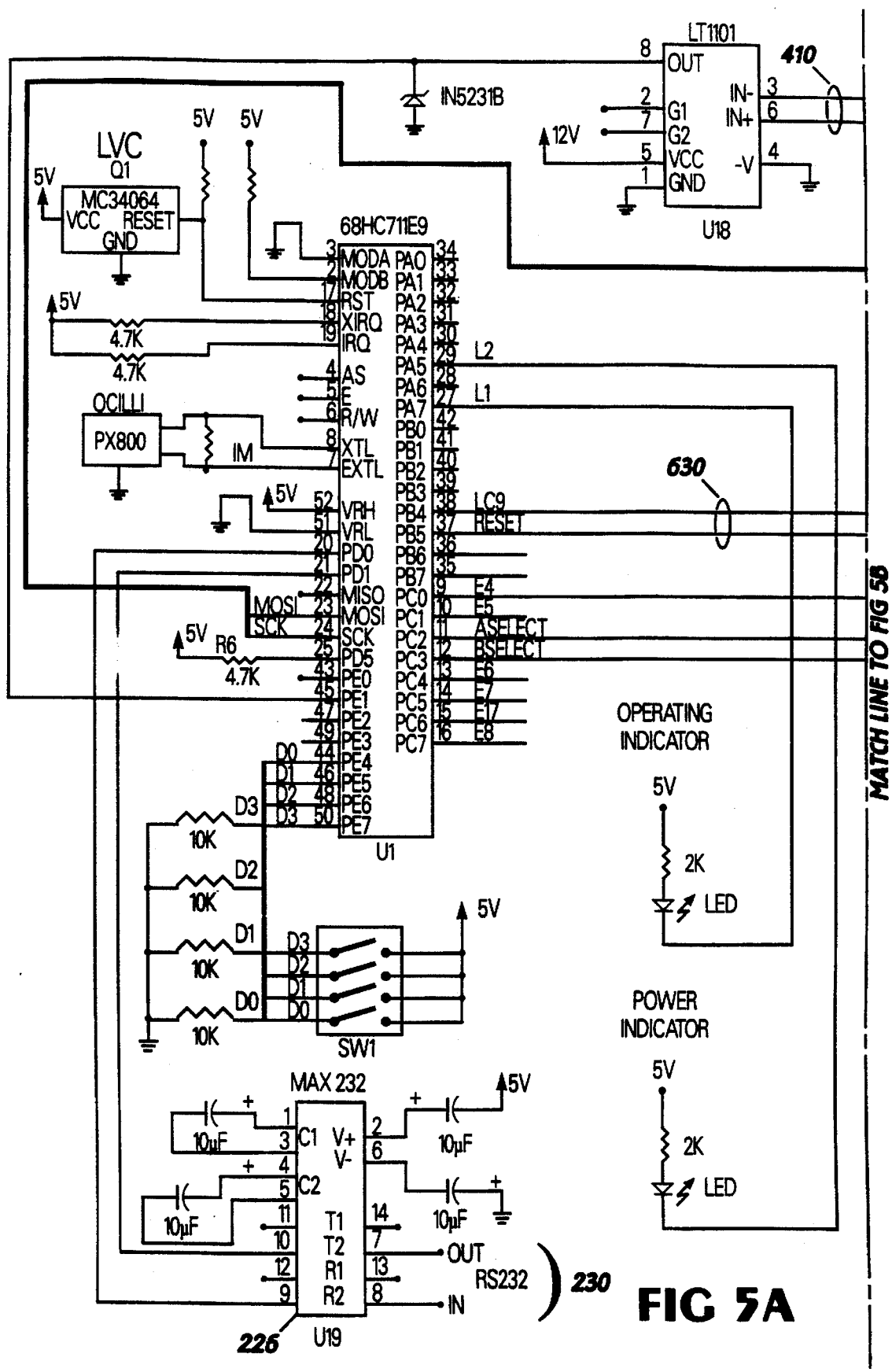
FIG. 5 is a simplified schematic of an embodiment of the inventive circuit in conjunction with a controlled ferroresonant rectifier.
Figure 5B:
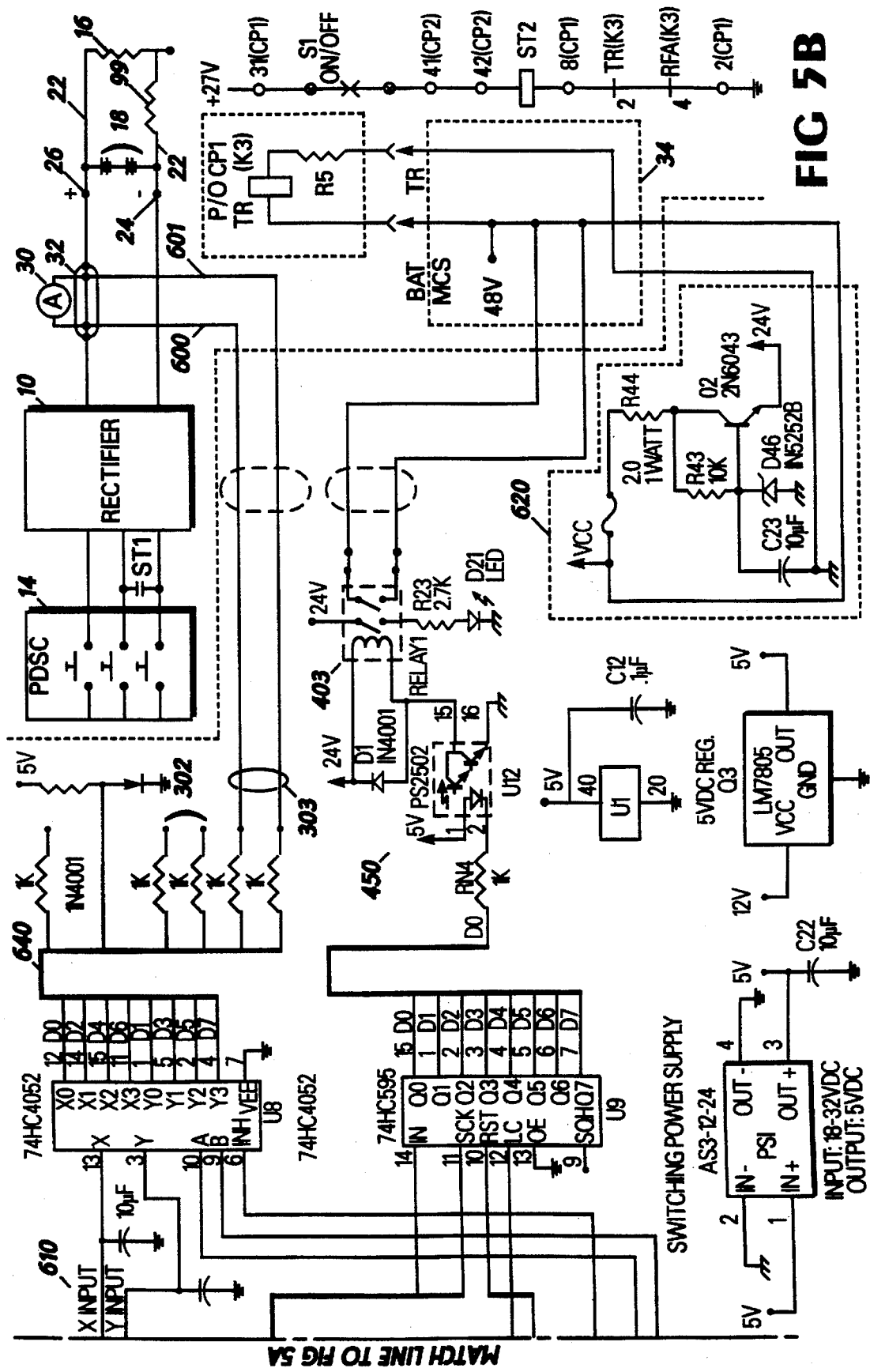

FIG. 5 shows a simplified schematic of the EMS circuit, showing primarily the components involved in controlling one rectifier and the controlled rectifier 10. A high-current shunt 32 between the rectifier 10 and the parallel combination of the load 16 and the battery string or strings 18 is tapped by conductors 600, 601 and returned to input 303 (in the illustrated case) to indicate the current being drawn by the battery string 18-load 16 combination. Microcontroller U1 turns on each multiplexer U4, U5, U6, U7, U8, and U17, shown in FIG. 2, individually. The analog voltage from each multiplexer, such as U4, is then output over analog channel 610 to the input of instrumentation amplifier U18 where it is then sent to the PEO input of microcontroller U1 and there digitized. The sum of all of the currents so sensed is computed by microcontroller U1 and compared with the power requirement of the load 16. Microcontroller U1 makes this comparison at frequent intervals, shutting off or turning on rectifiers such as 10, as necessary, to keep the maximum current supplied by the rectifiers within a selected percentage tolerance of the amount required to supply current to the load 16 plus a selected battery charging current. The selected battery charging current and the selected percentage tolerance may each either be stored in ROM or entered via the external port 230.

Components U9, U10, and U11 are latches. The outputs of each latch appear at their respective Q0 through Q7 pins and are under control of the microcontroller U1. Any combination of the Q outputs may be active. Each Q output is associated with one of the 20 opto-isolators. When a Q output is active, its associated opto-isolator is biased on. When the opto-isolator is biased on, it in turn will cause its associated relay (EMS output channels 1 through 20) to become energized. Ground will be closed to the TR lead through make contacts of the energized relay which will cause the associated rectifier to shut down.

To control the rectifiers 10, a positive voltage is supplied to TK (K3) via a voltage supply, which may be a voltage step-down circuit 620, as shown. The microcontroller U1 outputs a signal on data lines 630 (only some of which are shown in FIG. 5) corresponding to a selected one of the rectifiers, the signal indicating whether the rectifier 10 is to be turned on or off. Latch U9 (and, in FIG. 2, U10 and U11) is controlled by microcontroller U1, which supplies an input via channel 630. The output of the latch U9 (and any others) is sent to the opto-isolators 450 through bus 640, each opto-isolator 450 receiving its input via one bit on bus 640, corresponding to one bit of one of the latches (in FIG. 5, latch U9). In this embodiment, when a latch output is active, the associated, opto-isolator is biased on, which causes the associated relay, such as relay 403 in FIG. 5, to be energized. The TR lead in MCS34 will thus be closed, causing rectifier 10 to shut down. Microcontroller U1 can also cause rectifier 10 to turn on by causing latch U9 to cause the latch output to be inactive.

It is preferable, if normally-open relays are used as in the preferred embodiment, to have the opto-isolators 450 and relays 401–420 configured to turn on whenever the corresponding bit on bus 640 is low (i.e., near zero volts) to allow all rectifiers 10 to be turned on in the event of a power shutdown of EMS unit 238 itself. Although such a configuration risks thermal runaway of the strings of batteries, this (relatively) small risk is generally preferable to shutting off all rectifiers and causing the batteries to be drained, which would eventually result in loss of power to the central office and no available battery backup.

5. Thermal Runaway Control

Figure 6:
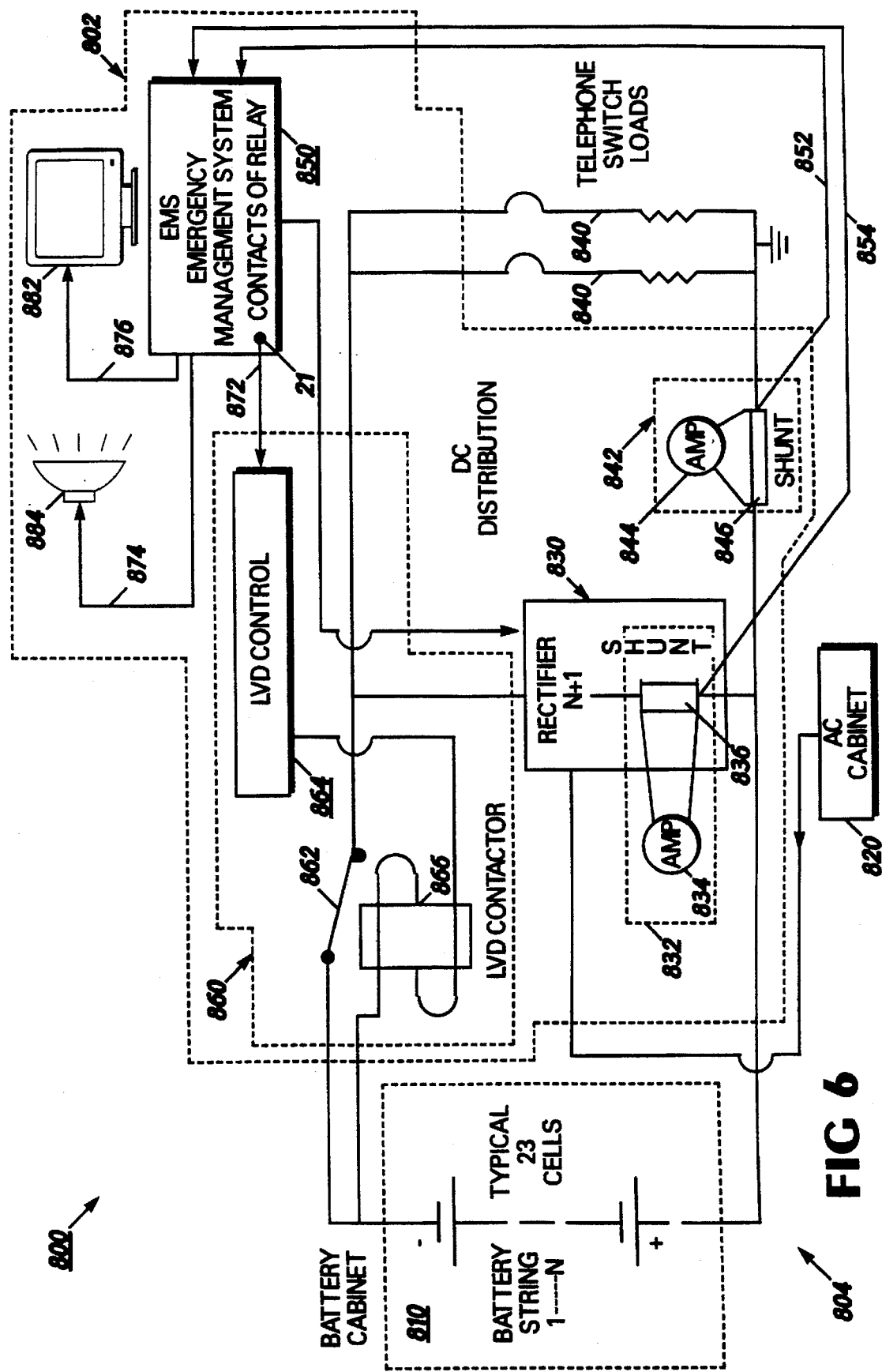
FIG. 6 is a simplified schematic of a circuit used to control thermal runaway.

FIG. 6 is a simplified schematic of a battery recharge system 800 employing a circuit 802 used to control thermal runaway. The system 800 comprises a conventional battery recharge unit 804 having a plurality of batteries 810 and a plurality of telephone switching loads 840 (two representative loads being shown here) connected in parallel. Power is supplied to the batteries 810 and the loads 840 from an AC power source 820 that supplies AC current to a plurality of rectifiers 830 (one representative rectifier being shown here). Power from the rectifiers 830 can be interrupted with a low voltage disconnect (LVD) system 860. The LVD system 860 comprises an LVD switch 862, an LVD control unit 864 and an LVD switch opening device 866 controlled by the LVD control unit 864.

The thermal runaway control circuit 802 comprises a control unit 850 that receives a plurality of rectifier current input signals 854 and load current input signals 852. The control unit 850 is capable of measuring time and could comprise a microprocessor, a plurality of discrete logic elements or a plurality of analog control circuits, as would be obvious to one skilled in the art. The current inputs 854 receive inputs from current measuring devices 832 connected to each rectifier 830 and the load inputs 852 receive inputs from current measuring devices 842 connected to each load 840. An illustrative example of a current measuring device 832 connected to a rectifier 830 would be a shunt 836 taken off of the current path in the rectifier connected to an ammeter 834. Similarly, the load current measuring devices 842 could comprise shunts 846 and ammeters 844. As would be obvious to one skilled in the art, many equivalents to the current measuring devices disclosed, such as clamp-on ammeters, could be satisfactorily employed in the present invention.

The control unit 850 is capable of generating the following signals: a control signal 872 to the LVD controller 864, a data signal 876 to a video terminal 882, and an alarm signal 874 to an alarm 884.

Figure 7:
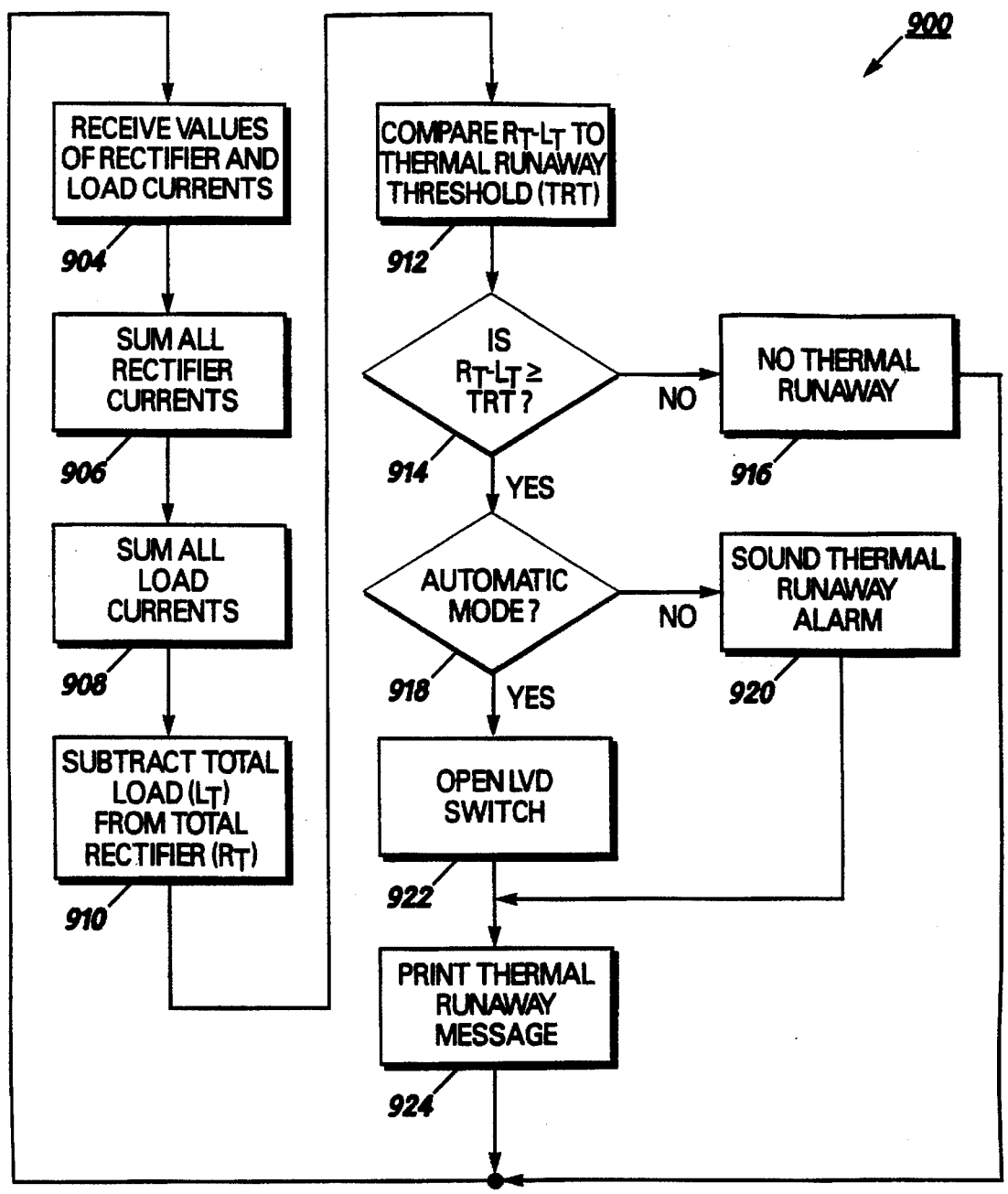
FIG. 7 is a simplified flow chart of a program and method used to control thermal runaway.

To prevent thermal runaway, the control unit 850 performs a series operational steps 900 shown in FIG. 7. The series of operational steps 900 could comprise a computer program (a representative example of such code, designed to run on a 68HC11 microprocessor is disclosed in the appendix following the specification), or a method embodied in logical steps, electro-mechanical steps, manual steps, or any combination thereof.

As shown in FIG. 7, the steps 900 comprise receiving 904 values of the individual rectifier currents and load currents. The rectifier currents are summed 906 and the load currents are summed 908. The total load current is subtracted from the total rectifier current 910. The resulting float, or excess, current of the subtracting step 910 is then compared 912 to a preselected value corresponding to the minimum float current indicative of thermal runaway. A test 914 determines if the float current is greater than or equal to the threshold and if the float current remains greater than or equal to the threshold for a predetermined period. If the float current is below the threshold, the system is in a "no thermal runaway" state 916 and control returns to the receiving step 904. If, on the other hand, the float current is greater than or equal to the threshold and remains greater than the threshold for a predetermined period, then thermal runaway exists. In this situation, a test 918 is performed to determine if the system is in automatic mode (although it will be readily understood that some systems may be constructed that are always in either an automatic mode or a manual mode). If the system is not in automatic mode, the system will generate a signal 920 to sound a thermal runaway alarm and then print a thermal runaway message 924 on a video terminal. If the system is in automatic mode, it will generate a signal 922 to open the low voltage disconnect switch, at this point it may also sound an alarm, and then it will print a thermal runaway message 924 on the video terminal. Once the thermal runaway message is printed 924, the system returns to the receive step 904.

It will thus be seen that an energy management system has been provided that can simply and reliably control the power supply of a telecommunications plant with battery backup, without risking thermal runaway through excessive battery charge. It will be readily appreciated by those skilled in the art that embodiments shown and described here are by way of example only. Numerous modifications will suggest

APPENDIX
THIS ROUTINE CHECKS THE AMOUNT OF CURRENT FLOWING INTO THE BATTERIES AFTER A PRESET AMOUNT OF TIME. IF THE CURRENT EXCEEDS A PREPROGRAMMED AMOUNT, THE ALARM RELAY IS RELEASED.

```
BATT 1:   INC 0E0H        ;INC 60 SECOND TIMER REGISTER
          LDAA 0E0H
          CMPA #3CH       ;CK IF 60 SECONDS PASSED
          BHS A161
          RTS
A161:     CLR 0E0H
          LDX 0B658H      ;CK IF USER PROGRAMMED A VALUE
          BEQ A162
          LDX0DEH         ;CK IF COUNTER CMPS WITH STORED TIME
          CPX 0B656H
          BHSA163
          INX             ;IF LOWER, INC TIMER REGISTER
          STX0DEH
          JMP A162
A163:     CLR 0E1H        ;CLR TEMP STORAGE LOCATIONS
          CLR 0E2H
          LDX #42H        ;ADD UP TOTAL AMPS BEING USED NOW
          LDY
          #0B628H
A165:     LDAA 0,Y        1ST, CK IF CH ACTIVE
          ORAA 1,Y
          BEQ A164
          LDAB 0,X        ;GET SHUNTS MULTIPLY FACTOR
          LDAA #00H
          JSR             ;MULTIPLY A/D VALUE WITH SHUNT FACTOR
          MULTIPLY        ;STORE RESULTS IN ACCUMULATOR
          ADDD 0E1H
          STD 0E1H        ;IF EXCEEDS 65536, THEN SYSTEM FAILURE
          BCC A164        ;*SYSD*
          LDAA #3
          JMP SYSF
A164:     INY
          INY
          INX
          CPS #55H        ;CK IF FINISH ADDING ALL CHANNELS
          BLS A165
          LDD 0E1H        ;CALC BATT CURRENT BY SUBTRACTING.
          SUBD 58H        ;POWER PLANTS CURRENT DRAW
          BCC A166
          LDD #00H
A166:     CPD 0B658H      ;COMPARE BATT CURRENT WITH STORE
          BLSA162         VALUE
          LDX             ;IF LOWER THEN EXIT ROUTINE
          #0FF20H         ;ELSE TRANSMIT ERROR MESSAGE
          JSR TRANS
          LDX
          #0FF80H
          JSR TRANS       ;SET ALARM BIT TO RELEASE ALARM RELAY
          BSET            ;SET TIMER TO CHECK CURRENT EVERY
          OP1,40H         SECOND
          LDAA #32H
          STAA 0E0H       ;EXIT
          RTS
A162:     BCLR            ;EXIT
          OP1,40H         ;CLEAR "CURRENT TOO HIGH" BIT
```

What is claimed is:

1. An apparatus for controlling thermal runaway in a telecommunications switching station backup battery recharging system receiving current from a power supply and delivering current through a rectifier to a battery and a load, the system having a low voltage disconnect-switch capable of interrupting current to the battery, the apparatus comprising:

a. means for generating a first signal having a first value representative of the current flowing through the rectifier;

b. means for generating a second signal having a second value representative of the current flowing through the load;

c. means for calculating a third value, the third value being equal to the second value subtracted from the first value; and d. means for generating a third signal indicative of thermal runaway when the third value exceeds a predetermined value for a predetermined period.

2. The apparatus of claim 1, further comprising means for interrupting current to the battery when said third signal exceeds the predetermined value.

3. The apparatus of claim 1, further comprising means for determining when said third signal exceeds said predetermined value for the predetermined period.

4. The apparatus of claim 1, further comprising means for generating an alarm upon generation of said third signal.

5. The apparatus of claim 1, further comprising means for displaying a thermal runaway warning message upon generation of said third signal.

6. The apparatus of claim 1, wherein said first signal generating means comprises a shunt-type current measuring circuit that measures the current flowing through the rectifier.

7. The apparatus of claim 1, wherein said second signal generating means comprises a shunt-type current measuring circuit that measures the current flowing through the load.

8. The apparatus of claim 1, wherein said calculating means comprises a microprocessor.

9. The apparatus of claim 1, wherein said calculating means comprises a comparator circuit that generates a difference signal representative of the difference between the first signal and the second signal.

10. The apparatus of claim 1, wherein said calculating means comprises a plurality of discrete logic elements that logically subtract the second value from the first value.

11. A method for controlling thermal runaway in a telecommunications switching station backup battery recharging system receiving current from a power supply and delivering current through a rectifier to at a battery and a load, the system having a low voltage disconnect switch capable of interrupting current to the battery, the method comprising the steps of:

a. generating a first signal having a first value representative of the current flowing through the rectifier;
   b. generating a second signal having a second value representative of the current flowing through the load;
   c. calculating a third value, the third value being equal to the second value subtracted from the first value; and
   d. generating a third signal indicative of thermal runaway when the third value exceeds a predetermined value for a predetermined period.

12. The method of claim 11, further comprising the step of interrupting current to the battery when said third signal exceeds the predetermined value.

13. The method of claim 12, wherein said interrupting step comprises the step of applying said third signal to a circuit that causes the low voltage disconnect switch to open and interrupt current flow to the battery.

14. The method of claim 12, wherein said interrupting step comprises the step of manually causing the low voltage disconnect to interrupt current flow to the battery.

15. The method of claim 11, further comprising the step of generating an alarm upon generation of said third signal.

16. The method of claim 11, further comprising the step of displaying a thermal runaway warning message upon generation of said third signal.

17. A series of operational steps to be performed on a computer used to control an apparatus for controlling thermal runaway in a telecommunications switching station backup battery recharging system receiving current from a power supply and delivering current through a rectifier to at a battery and a load, the system having a low voltage disconnect switch capable of interrupting current to the battery, comprising the operational steps of:

a. receiving a first signal having a first value representative of the current flowing through the rectifier;
   b. receiving a second signal having a second value representative of the current flowing through the load;
   c. subtracting said second value from said first value, thereby creating a difference value;
   d. comparing the difference value to a preselected fourth value, said fourth preselected value indicating a minimum difference value corresponding to a thermal runaway condition; and
   e. generating a signal that indicates thermal runaway when the difference signal is at least equal to the fourth value for a predetermined period.

18. The series of operational steps of claim 17, further comprising the step of generating a signal causing the low voltage disconnect to open, thereby interrupting current flow to the battery when the difference value indicates the existence of a thermal runaway condition.

19. The series of operational steps of claim 17, further comprising the step of generating an alarm signal when the difference value indicates the existence of a thermal runaway condition.

20. The series of operational steps of claim 17, further comprising the step displaying a thermal runaway warning message on a terminal when the difference value indicates the existence of a thermal runaway condition.

* * * * *